(12) United States Patent
Hartmann et al.

(10) Patent No.: US 10,590,321 B2
(45) Date of Patent: *Mar. 17, 2020

(54) ARTICLES CONTAINING FUNCTIONAL POLYMERIC PHASE CHANGE MATERIALS AND METHODS OF MANUFACTURING THE SAME

(71) Applicant: Outlast Technologies, LLC, Golden, CO (US)

(72) Inventors: Mark Hartmann, Boulder, CO (US); Aharon Eyal, Jerusalem (IL)

(73) Assignee: OUTLAST TECHNOLOGIES, GMBH, Heidenheim (DE)

( * ) Notice: Subject to any disclaimer, the term of this patent is extended or adjusted under 35 U.S.C. 154(b) by 262 days.

This patent is subject to a terminal disclaimer.

(21) Appl. No.: 14/959,936

(22) Filed: Dec. 4, 2015

(65) Prior Publication Data

US 2016/0177157 A1 Jun. 23, 2016

Related U.S. Application Data

(63) Continuation of application No. 12/185,908, filed on Aug. 5, 2008, now Pat. No. 9,234,059, which is a
(Continued)

(51) Int. Cl.
*C09K 5/02* (2006.01)
*C09K 5/06* (2006.01)
(Continued)

(52) U.S. Cl.
CPC .............. *C09K 5/063* (2013.01); *C08F 8/14* (2013.01); *C08F 120/32* (2013.01);
(Continued)

(58) Field of Classification Search
CPC ............. C09K 5/00; C09K 5/02; C09K 5/063
(Continued)

(56) References Cited

U.S. PATENT DOCUMENTS 1,902,529 A 3/1933 Stockley et al.
4,181,643 A 1/1980 Kreibich et al.
(Continued)

FOREIGN PATENT DOCUMENTS

CN 1317602 A 10/2001
EP 0581274 A1 2/1994
(Continued)

OTHER PUBLICATIONS

Matsumoto, Hiroshi, "Japanese Office Action Re Application No. 2014-196365", dated May 23, 2017, p. 4, Published in: JP.
(Continued)

*Primary Examiner* — Matthew D Matzek
(74) *Attorney, Agent, or Firm* — Neugeboren O'Dowd PC

(57) ABSTRACT

A method of producing a temperature regulating article is disclosed. The method includes combining a functional polymeric phase change material with a substrate. The functional polymeric PCM has the capability of absorbing or releasing heat to adjust heat transfer at or within a temperature stabilizing range and having at least one phase change temperature in the range between –10° C. and 100° C. and a phase change enthalpy of at least 5 Joules per gram, the functional polymeric PCM has a backbone chain, side chains, and a crystallizable section. The side chains form the crystallizable section. The functional PCM carries at least one reactive function on at least one of the side chains or the backbone chain. The reactive function is capable of forming at least a first covalent bond with the second material or with a connecting compound capable of reacting with reactive functions of the second material.

27 Claims, 11 Drawing Sheets

Related U.S. Application Data continuation-in-part of application No. 12/174,609, filed on Jul. 16, 2008, now abandoned, and a continuation-in-part of application No. 12/174,607, filed on Jul. 16, 2008, now abandoned.

(51) Int. Cl.

| | | |
|---|---|---|
| *D01F 1/10* | (2006.01) | |
| *D06M 15/263* | (2006.01) | |
| *D06M 15/273* | (2006.01) | |
| *C08F 220/18* | (2006.01) | |
| *D01F 2/28* | (2006.01) | |
| *D01F 6/38* | (2006.01) | |
| *C08F 8/14* | (2006.01) | |
| *C08F 120/32* | (2006.01) | |
| *D06M 101/06* | (2006.01) | |

(52) U.S. Cl.
CPC .............. *C08F 220/18* (2013.01); *D01F 1/10* (2013.01); *D01F 2/28* (2013.01); *D01F 6/38* (2013.01); *D06M 15/263* (2013.01); *D06M 15/273* (2013.01); *D06M 2101/06* (2013.01); *D06M 2400/01* (2013.01); *Y10T 428/249921* (2015.04); *Y10T 428/249953* (2015.04); *Y10T 428/2933* (2015.01); *Y10T 428/2964* (2015.01); *Y10T 428/3188* (2015.04); *Y10T 428/31743* (2015.04); *Y10T 428/31855* (2015.04); *Y10T 442/20* (2015.04)

(58) Field of Classification Search
USPC ............. 428/320.3, 323, 327, 402, 403, 913
See application file for complete search history.

(56) References Cited

U.S. PATENT DOCUMENTS

| | | | |
|---|---|---|---|
| 4,259,198 A | 3/1981 | Kreibich et al. | |
| 4,756,958 A | 7/1988 | Bryant et al. | |
| 4,851,291 A | 7/1989 | Vigo et al. | |
| 4,871,615 A | 10/1989 | Vigo et al. | |
| 4,908,238 A | 3/1990 | Vigo et al. | |
| 5,366,801 A | 11/1994 | Bryant et al. | |
| 5,851,338 A | 12/1998 | Pushaw | |
| 5,885,475 A | 3/1999 | Salyer | |
| 5,897,952 A | 4/1999 | Vigo et al. | |
| 6,004,662 A | 12/1999 | Buckley | |
| 6,207,738 B1 | 3/2001 | Zuckerman et al. | |
| 6,319,599 B1 | 11/2001 | Buckley | |
| 6,379,753 B1 | 4/2002 | Soane et al. | |
| 6,380,336 B1 | 4/2002 | Soane et al. | |
| 6,387,492 B2 | 5/2002 | Soane et al. | |
| 6,472,476 B1 | 10/2002 | Soane et al. | |
| 6,485,530 B1 | 11/2002 | Soane et al. | |
| 6,497,732 B1 | 12/2002 | Soane et al. | |
| 6,497,733 B1 | 12/2002 | Ware, Jr. et al. | |
| 6,503,976 B2 | 1/2003 | Zuckerman et al. | |
| 6,517,648 B1 | 2/2003 | Bouchette et al. | |
| 6,517,933 B1 | 2/2003 | Soane et al. | |
| 6,544,594 B2 | 4/2003 | Linford et al. | |
| 6,599,327 B2 | 7/2003 | Soane et al. | |
| 6,607,564 B2 | 8/2003 | Soane et al. | |
| 6,607,994 B2 | 8/2003 | Soane et al. | |
| 6,617,267 B2 | 9/2003 | Soane et al. | |
| 6,617,268 B1 | 9/2003 | Offord et al. | |
| 6,660,667 B2 | 12/2003 | Zuckerman et al. | |
| 6,679,924 B2 | 1/2004 | Ware, Jr. et al. | |
| 6,793,856 B2 | 9/2004 | Hartmann et al. | |
| 6,830,782 B2 | 12/2004 | Kanazawa | |
| 6,855,422 B2 | 2/2005 | Magill et al. | |
| 7,135,424 B2 | 11/2006 | Worley et al. | |
| 7,160,612 B2 | 1/2007 | Magill et al. | |
| 7,241,497 B2 | 7/2007 | Magill et al. | |
| 7,244,497 B2 | 7/2007 | Hartmann et al. | |
| 9,303,335 B2 | 4/2016 | Kolbe et al. | |
| 2002/0009473 A1 | 1/2002 | Tebbe | |
| 2002/0120988 A1 | 9/2002 | Soane et al. | |
| 2002/0122890 A1 | 9/2002 | Linford et al. | |
| 2002/0152560 A1 | 10/2002 | Soane et al. | |
| 2002/0155771 A1 | 10/2002 | Soane et al. | |
| 2002/0160675 A1 | 10/2002 | Linford et al. | |
| 2002/0189024 A1 | 12/2002 | Soane et al. | |
| 2002/0190408 A1 | 12/2002 | Houston et al. | |
| 2003/0008078 A1 | 1/2003 | Soane et al. | |
| 2003/0013369 A1* | 1/2003 | Soane ................... D06M 16/00 442/181 | |
| 2003/0021756 A1 | 1/2003 | Ferrari | |
| 2003/0035951 A1 | 2/2003 | Magill et al. | |
| 2003/0051295 A1 | 3/2003 | Soane et al. | |
| 2003/0079302 A1 | 5/2003 | Soane et al. | |
| 2003/0101518 A1 | 6/2003 | Linford et al. | |
| 2003/0101522 A1 | 6/2003 | Linford et al. | |
| 2003/0104134 A1 | 6/2003 | Linford et al. | |
| 2003/0145397 A1 | 8/2003 | Ware, Jr. et al. | |
| 2004/0011989 A1 | 1/2004 | Lin et al. | |
| 2004/0026659 A1 | 2/2004 | Lin | |
| 2004/0029472 A1 | 2/2004 | Lin | |
| 2004/0044128 A1 | 3/2004 | Lin et al. | |
| 2004/0048541 A1 | 3/2004 | Offord et al. | |
| 2004/0055093 A1 | 3/2004 | Offord et al. | |
| 2004/0058006 A1 | 3/2004 | Barry et al. | |
| 2004/0126555 A1 | 7/2004 | Hartmann et al. | |
| 2005/0208286 A1* | 9/2005 | Hartmann ................ C08J 3/201 428/292.1 | |
| 2010/0012883 A1 | 1/2010 | Hartmann et al. | |

FOREIGN PATENT DOCUMENTS

| | | |
|---|---|---|
| JP | 04163370 A | 6/1992 |
| JP | 055215 A | 1/1993 |
| JP | 05156570 A | 6/1993 |
| JP | 05156576 A | 6/1993 |
| JP | 05214672 A | 8/1993 |
| JP | 5239716 A | 9/1993 |
| JP | 05331754 A | 12/1993 |
| JP | 06041818 A | 2/1994 |
| JP | 0665565 A | 3/1994 |
| JP | 06200417 A | 7/1994 |
| JP | 06234840 A | 8/1994 |
| JP | 08246227 A | 9/1996 |
| JP | 08311716 A | 11/1996 |
| JP | 05163485 A | 6/1997 |
| JP | 11247069 A | 9/1999 |
| JP | 11350240 A | 12/1999 |
| JP | 2000192326 A | 7/2000 |
| JP | 2000313895 A | 11/2000 |
| JP | 2001172866 A2 | 6/2001 |
| JP | 2002087953 A | 3/2002 |
| JP | 2002317329 A | 10/2002 |
| JP | 2002348780 A2 | 12/2002 |
| JP | 2003020568 A2 | 1/2003 |
| JP | 2003027337 A2 | 1/2003 |
| JP | 2003193371 A | 7/2003 |
| JP | 2003520871 A | 7/2003 |
| JP | 2003268358 A2 | 9/2003 |
| JP | 2003268359 A | 9/2003 |
| JP | 2003268679 A2 | 9/2003 |
| JP | 2003293223 A2 | 10/2003 |
| JP | 2004003087 A2 | 1/2004 |
| JP | 2004011032 A2 | 1/2004 |
| JP | 2011518770 A | 6/2011 |
| JP | 5624983 B2 | 11/2014 |
| WO | 9846814 A1 | 10/1998 |
| WO | 0106054 A1 | 1/2001 |
| WO | 0125511 A1 | 4/2001 |
| WO | 0212607 A2 | 2/2002 |
| WO | 03076547 A1 | 9/2003 |
| WO | 2004007631 A1 | 1/2004 |
| WO | 2007130709 A2 | 11/2007 |
| WO | 2008030648 A1 | 3/2008 |

(56) References Cited

FOREIGN PATENT DOCUMENTS

| WO | 2010008908 A1 | 1/2010 |
|---|---|---|
| WO | 2010008909 A1 | 1/2010 |

OTHER PUBLICATIONS

Gugliotta, Nicole T., "Office Action Re U.S. Appl. No. 13/779,035", dated Aug. 25, 2016, p. 44, Published in: US.

Schneider, Laura A., "Response to Office Action Re U.S. Appl. No. 13/779,035", dated Apr. 25, 2016, p. 10, Published in: US.

Shigeta, Eiko, "Japanese Office Action Re Application No. 2015-054220", dated Nov. 29, 2016, p. 6, Published in: JP.

Hollender, C., "European Office Action re Application No. 08022532.9", dated Aug. 1, 2016, p. 4, Published in: EP.

Matsumoto, Hiroshi, "Japanese Office Action re Application No. 2014-196365", dated Jul. 5, 2016, p. 5, Published in: JP.

Xiaowei, Gao, "Chinese Office Action re Application No. 201080066869.6", dated Jun. 20, 2016, p. 12, Published in: CN.

Sewia Patent & Law, "Notification of Third Party Information Statement Filed re Application No. 2014-196365", dated Apr. 12, 2016, p. a, Published in: JP.

Anonymous, "Third Party Information Statement re Application No. 2014-196365", dated Mar. 31, 2016, p. 41, Published in: JP.

Hollender, C., "European Office Action re Application No. 097985386", dated Jun. 3, 2016, p. 5, Published in: EP.

Shigeta, Eiko, "Japanese Office Action re Application No. 2015054220", dated Mar. 22, 2016, p. 8, Published in: JP.

Yi, Li, "Response to Chinese Office Action re Application No. 2010800668696", dated May 25, 2016, p. 12, Published in: CN.

Free Dictionary, "Article about Cotton Fabric", 1979, p. 2, Publisher: The Great Soviet Encyclopedia. Retrieved from http://encyclopedia2.thefreedictionary.com/Cotton+Fabric.

Celanese Corporation, "Man-Made Fiber and Textile Dictionary", Feb. 1, 1986, p. 3, 4th Edition.

Moore, Cathy R., "Request for Reexamination re U.S. Pat. No. 7,790,283", dated Jan. 28, 2016, p. 101, Published in: US.

Torres Velazquez, Norca Liz, "Office Action re U.S. Appl. No. 90/013,689", dated Mar. 2, 2016, p. 20, Published in: US.

Xiaowei, Gao, "Chinese Office Action re Application No. 201080066869.6", dated Feb. 26, 2016, p. 10, Published in: CN.

Hale, D.V., et al., "Phase Change Materials Handbook", Sep. 1, 1971, p. 89, Publisher: NASA Contractor Report, Published in: Huntsville, AL.

Falbe, Dr. Jurgen, et al., "Rompp Chemie Lexikon", 1991, p. 3216, 9th Edition, Publisher: George Thieme Verlag Stuttgart, Published in: New York, NY.

Wunderlinch, Bernhard et al., "Specific Heat of Synthetic High Polymers. IX. Poly(ethylene sebacate)", "Journal of Polymer Science", Mar. 10, 2003, pp. 125-130, vol. 32, Publisher: Interscience Publishers, Inc., Published in: New York, US.

Ahilan, B., "India Office Action Re Application No. 1119/DELNP/2011", dated Feb. 16, 2017, p. 9, Published in: IN.

Japanese Patent Office, "Japanese Office Action Re Application No. 2015-054220", dated Apr. 20, 2017, p. 2, Published in: JP.

Zonghua, Ren, "Chinese Office Action re Application No. 201080066869.6", dated Nov. 18, 2015, p. 10, Published in: CN.

Zonghua, Ren, "Response to Chinese Office Action re Application No. 201080066869.6", dated Sep. 28, 2015, p. 12, Published in: CN.

Zonghua, Ren, "Response to Chinese Office Action re Application No. 201080066869.6", dated Jan. 26, 2016, p. 11, Published in: CN.

Martinez, Marcos V., "Extended European Search Report Re Application No. 10849990.6", dated Jan. 11, 2018, p. 7, Published in: EP.

Uhlig, Robert, "Extended European Search Report Re Application No. 07797096.0", dated Oct. 17, 2017, p. 14, Published in: EP.

Uhlig, Robert, "Extended European Search Report Regarding Application No. 19185630.1", dated Oct. 23, 2019, p. 9, Published in: EU.

* cited by examiner

Polymeric PCM with reactive endgroups

R〰〰〰〰〰〰〰〰〰〰〰〰〰〰〰〰〰〰R$_1$

R = any textile reactive functional group, R$_1$ = can be same as R or H

Fig.3

ARTICLES CONTAINING FUNCTIONAL POLYMERIC PHASE CHANGE MATERIALS AND METHODS OF MANUFACTURING THE SAME

CROSS REFERENCE TO RELATED APPLICATIONS

This application is a continuation of U.S. patent application Ser. No. 12/185,908 filed Aug. 5, 2008 and entitled "Articles Containing Functional Polymeric Phase Change Materials and Methods of Manufacturing the Same," which is a continuation-in-part of U.S. patent application Ser. No. 12/174,607, entitled Functional Polymeric Phase Change Materials and Methods of Manufacturing the Same, filed on Jul. 16, 2008. U.S. patent application Ser. No. 12/185,908 is also a continuation-in-part of U.S. patent application Ser. No. 12/174,609, entitled Functional Polymeric Phase Change Materials, filed on Jul. 16, 2008. The details of these applications are incorporated herein by reference in their entirety.

FIELD OF THE INVENTION

In general, the present invention relates to articles containing functionally reactive phase change materials and methods for manufacturing those materials. In particular, but not by way of limitation, the present invention relates to articles containing functionally reactive polymeric phase change materials that form a covalent or an electrovalent interaction with another material.

BACKGROUND OF THE INVENTION

The modification of textiles to provide temperature regulating properties through the generalized use of phase change materials (PCMs) is known. The use of microencapsulated PCM (mPCM), their methods of manufacture and applications thereof have also been widely disclosed. For example, the following references all use microcapsules in their application:

1. U.S. Pat. No. 5,366,801—Fabric with Reversible Enhanced Thermal Properties
2. WO0212607—Thermal Control Nonwoven
3. U.S. Pat. No. 6,517,648—Process for Preparing a Non-Woven Fibrous Web
4. JP05-156570—Fibrous Structure having Heat Storage Ability and its Production
5. US20040029472—Method and compound fabric with latent heat effect
6. US20040026659—Composition for Fabricating Phase-Change Material Microcapsules and a Method for Fabricating the Microcapsules
7. US20040044128—Method and Microcapsule Compound Waterborne Polyurethane
8. US2004011989—Fabric Coating Composition with Latent Heat Effect and Method for Fabricating the Same
9. US20020009473—Microcapsule, Method for its Production, Use of same, and Coating Liquid with Such
10. JP11350240—Production of Fiber having Adhered Microcapsule on Surface
11. JP2003-268679—Yarn having Heat Storage Property and Woven Fabric using the same.

Microcapsules, however, are expensive, can rupture, need additional resinous binders for adhesion, and can cause poor fabric flexibility and properties.

Numerous other disclosures outline the development of temperature regulating textiles by first manufacturing a fiber that contains a PCM or mPCM. For example, the following all disclose compositions, methods of manufacture, processes, and fabrics created from synthetically manufactured fibers. While this might be acceptable in some circumstances, the applications disclosed below omit all of the natural cellulosic and proteinaceous fibers and fabrics such as cotton, flax, leather, wool, silk, and fur. They also do not allow for the post treatment of synthetic fibers or fabrics.

12. US20030035951—Multi-Component Fibers having Enhanced Reversible Thermal Properties and Methods of Manufacturing Thereof.
13. U.S. Pat. No. 4,756,958—Fiber with Reversible Enhance Thermal Storage Properties and Fabrics made there from.
14. JP5331754—Heat Absorbing and Releasing Nonwoven Fabric of Conjugate Fiber
15. JP6041818—Endothermic and Exothermic Conjugate Fiber
16. JP5239716—Thermally Insulating Conjugate Fiber
17. JP8311716—Endothermic and Exothermic Conjugate Fiber
18. JP5005215—Endothermic and Exothermic Conjugate Fiber
19. JP2003027337—Conjugate Fiber Having Heat-Storing and Heat-Retaining Property
20. JP07-053917—Heat-Accumulating and Heat-Insulating Fiber
21. JP2003-293223—Endothermic Conjugate Fiber
22. JP02289916—Thermal Storage Fiber
23. JP03326189—Fiber with Heat Storage Ability
24. JP04-219349—Heat Storage Composition
25. JP06-234840—Heat Storage Material
26. JP Appl. #2001-126109—Heat Storage Fiber, Method of Producing the same, and Heat Storage Cloth Material
27. JP03352078—Heat Storage Material
28. JP04-048005—Fabric Product with Heat Storing Ability
29. WO0125511—Thermal Energy Storage Materials
30. JP02317329—Heat Storage Fiber-Method for Producing the same and Heat Storage Cloth Material
31. WO2004007631—Heat-Storage Material, Composition Therefore, and uses of these
32. JP2003-268358—Heat-Storage Material use around Body
33. JP2004-011032—Temperature-Controllable Fiber and Fabric
34. JP2004-003087—Heat Storable Composite Fiber and Cloth Material having Heat-Storing Properties
35. JP06200417—Conjugate Fiber Containing Heat-Accumulation Material and its Production
36. CN1317602—Automatic Temp-Regulating Fibre and its Products
37. U.S. Pat. No. 5,885,475—Phase Change Materials Incorporated throughout the Structure of Polymer Fibers In addition, U.S. Pat. Nos. 4,851,291, 4,871,615, 4,908,238, and 5,897,952 disclose the addition of polyethylene glycol (PEG), polyhydric alcohol crystals, or hydrated salt PCM to hollow and non-hollow fibers. The fibers can be natural or synthetic, cellulosic, protein based, or synthetic hydrocarbon based. The non-hollow fibers have PEG materials deposited or reacted on the surface to act like PCM. These are problematic in that they are very hydrophilic causing excessive moisture absorption problems, and wash durability problems. There is no known disclosure of the use of acrylic, methacrylic polymers or other hydrophobic polymeric PCMs for these applications.

U.S. Pat. No. 6,004,662 mentions the use of acrylate and methacrylate polymers with C16 to C18 alkyl side chains as PCMs but not as unencapsulated or functionalized or reacted to the surface of fibrous textiles.

U.S. Pat. Nos. 4,259,198 and 4,181,643 disclose the use of crystalline crosslinked synthetic resin selected from the group of epoxide resins, polyurethane resins, polyester resins and mixtures thereof which contain, as crystallite forming blocks, segments of long-chain dicarboxylic acids or diols as PCMs, but not in conjunction with fibers or textiles.

Specific fiber and textile treatments or finishes in which specific compounds are reacted onto the substrate to provide some thermal change (usually based on moisture) have been disclosed. These systems are not based on long side chain alkyl, or long chain glycol acrylates or methacrylates that undergo a thermal phase change to provide improved latent heat effects. Examples include:

38. JP2003-020568—Endothermic Treating Agent for Fiber Material
39. JP2002-348780—Hygroscopic and Exothermic Cellulose-Based Fiber
40. JP2001-172866—Hygroscopic and Exothermic Cellulose-Based Fiber Product having Excellent Heat Retaining Property
41. JP11-247069—Warm Retainable Exothermic Cloth Various disclosures describe the use of acrylic or methacrylic copolymers containing long chain alkyl moieties for textile finishes but only for properties such as grease repellency, soil resistance, permanent press properties, and quickness of drying. They do not disclose or mention the use of high purity polymers as PCMs, latent heat storage treatments or textile finishes which can impart temperature regulation and improved comfort. More specifically, they do not disclose advantageous polymer architecture such as mol. wt., mol. wt. distribution or specific copolymer architecture. Example include:

42. U.S. Pat. No. 6,679,924—Dye fixatives
43. U.S. Pat. No. 6,617,268—Method for protecting cotton from enzymatic attack by cellulase enzymes
44. U.S. Pat. No. 6,617,267—Modified textile and other materials and methods for their preparation
45. U.S. Pat. No. 6,607,994—Nanoparticle-based permanent treatments for textiles
46. U.S. Pat. No. 6,607,564—Modified textiles and other materials and methods for their preparation
47. U.S. Pat. No. 6,599,327—Modified textiles and other materials and methods for their preparation
48. U.S. Pat. No. 6,544,594—Water-repellent and soil-resistant finish for textiles
49. U.S. Pat. No. 6,517,933—Hybrid polymer materials
50. U.S. Pat. No. 6,497,733—Dye fixatives
51. U.S. Pat. No. 6,497,732—Fiber-reactive polymeric dyes
52. U.S. Pat. No. 6,485,530—Modified textile and other materials and methods for their preparation
53. U.S. Pat. No. 6,472,476—Oil- and water-repellent finishes for textiles
54. U.S. Pat. No. 6,387,492—Hollow polymeric fibers
55. U.S. Pat. No. 6,380,336—Copolymers and oil- and water-repellent compositions containing them
56. U.S. Pat. No. 6,379,753—Modified textile and other materials and methods for their preparation
57. US20040058006—High affinity nanoparticles
58. US20040055093—Composite fibrous substrates having protein sheaths
59. US20040048541—Composite fibrous substrates having carbohydrate sheaths
60. US20030145397—Dye fixatives
61. US20030104134—Water-repellent and soil-resistant finish for textiles
62. US20030101522—Water-repellent and soil-resistant finish for textiles
63. US20030101518—Hydrophilic finish for fibrous substrates
64. US20030079302—Fiber-reactive polymeric dyes
65. US20030051295—Modified textiles and other materials and methods for their preparation
66. US20030013369—Nanoparticle-based permanent treatments for textiles
67. US20030008078—Oil- and water-repellent finishes for textiles
68. US20020190408—Morphology trapping and materials suitable for use therewith
69. US20020189024—Modified textiles and other materials and methods for their preparation
70. US20020160675—Durable finishes for textiles
71. US20020155771—Modified textile and other materials and methods for their preparation
72. US20020152560—Modified textiles and other materials and methods for their preparation
73. US20020122890—Water-repellent and soil-resistant finish for textiles
74. US20020120988—Abrasion- and wrinkle-resistant finish for textiles Although present compositions and methods are functional, they do not take advantage of the unique nature and functional aspects that accompanies the use of polymeric materials for the phase change material.

SUMMARY OF THE INVENTION

Exemplary embodiments are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

In accordance with one aspect, a method of producing an article comprises providing a functional polymeric phase change material, providing a substrate, and combining the functional polymeric phase change material with the substrate.

In accordance with another aspect, a precursor for the production of an article comprises a functional polymeric phase change material and at least one other ingredient.

In accordance with another aspect, a method of producing a temperature regulating article comprises providing a precursor comprising a functional polymeric phase change material, providing a substrate, and combining the functional polymeric phase change material of the precursor with the substrate.

Many additional aspects and embodiments are described herein as would be recognized by one of ordinary skill in the art.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

FIG. 3 shows a representative example of an FP-PCM based on a crystallizable backbone polymer such as polyesters, polyethers, polyurethanes, polyamides, polyimides, polyacetals, polysulfides, polysulfones, etc where R=reactive functional groups on one end of the polymer chain;

DETAILED DESCRIPTION

Figure 1:
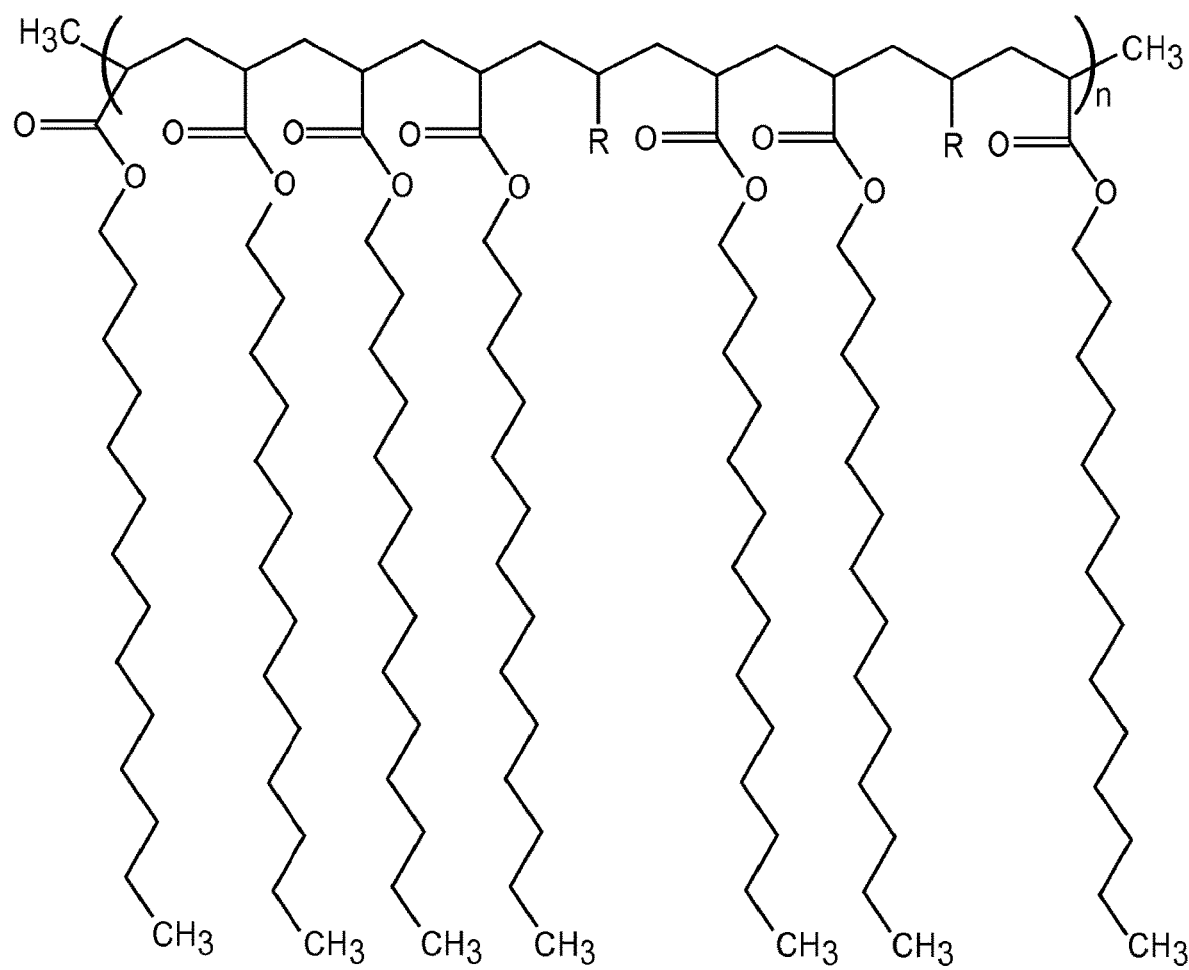
FIGS. 1 and 2 show representative examples of functional polymeric phase change materials (FP-PCMs) based on a (meth)acrylate backbone with crystallizable side chains based on long chain alky groups or long chain ether groups respectively where R=reactive functional groups.
Figure 1A:
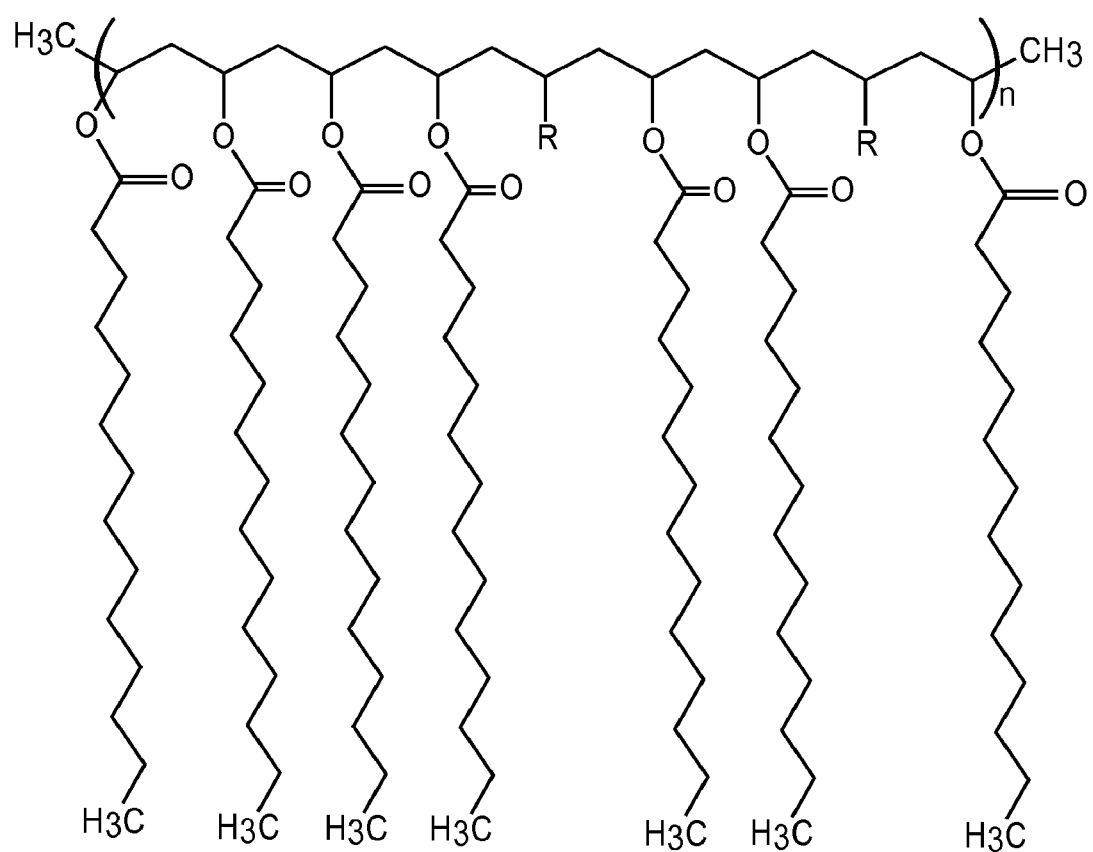
FIGS. 1a and 2a show representative examples of FP-PCMs based on a vinyl ester backbone with crystallizable side chains based on long chain alky groups or long chain ether groups respectively where R=reactive functional groups.
Figure 1B:
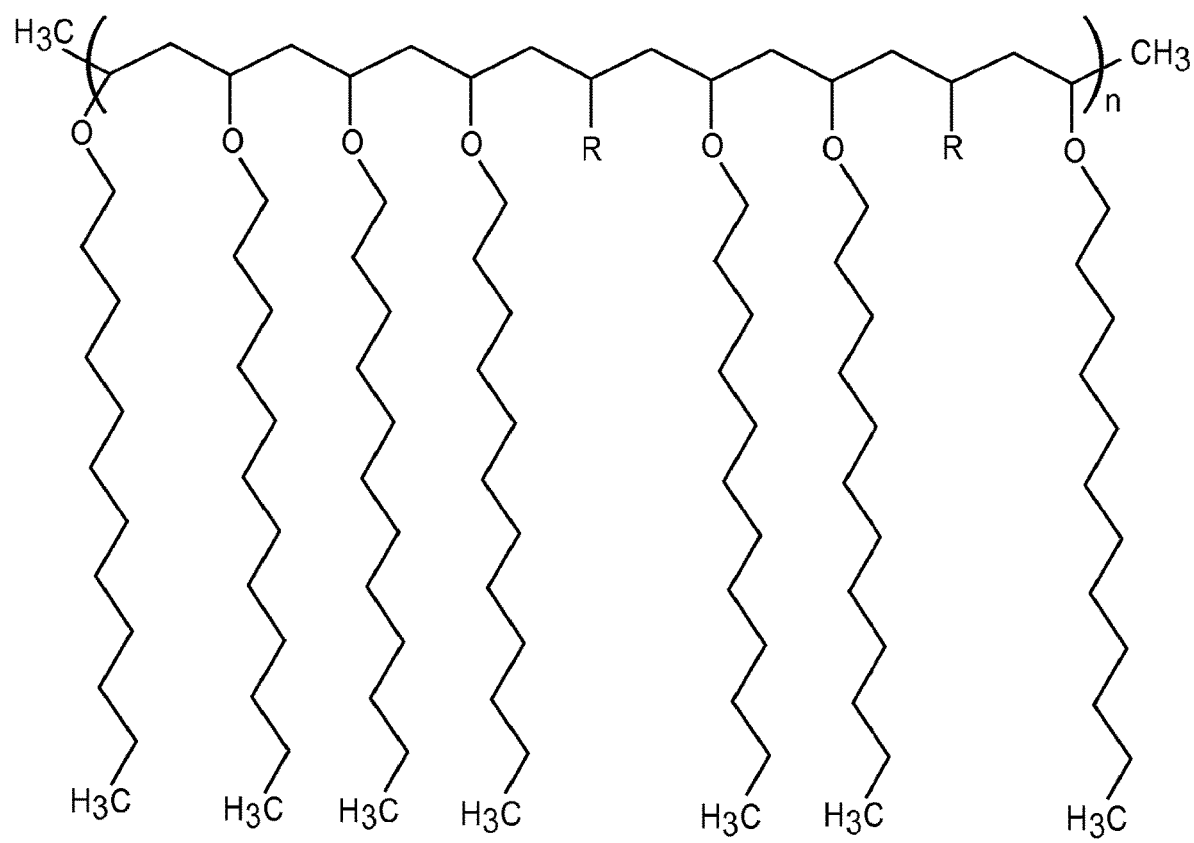
FIGS. 1b and 2b show representative examples of FP-PCMs based on a vinyl ether backbone with crystallizable side chains based on long chain alky groups or long chain ether groups respectively where R=reactive functional groups.
Figure 1C:
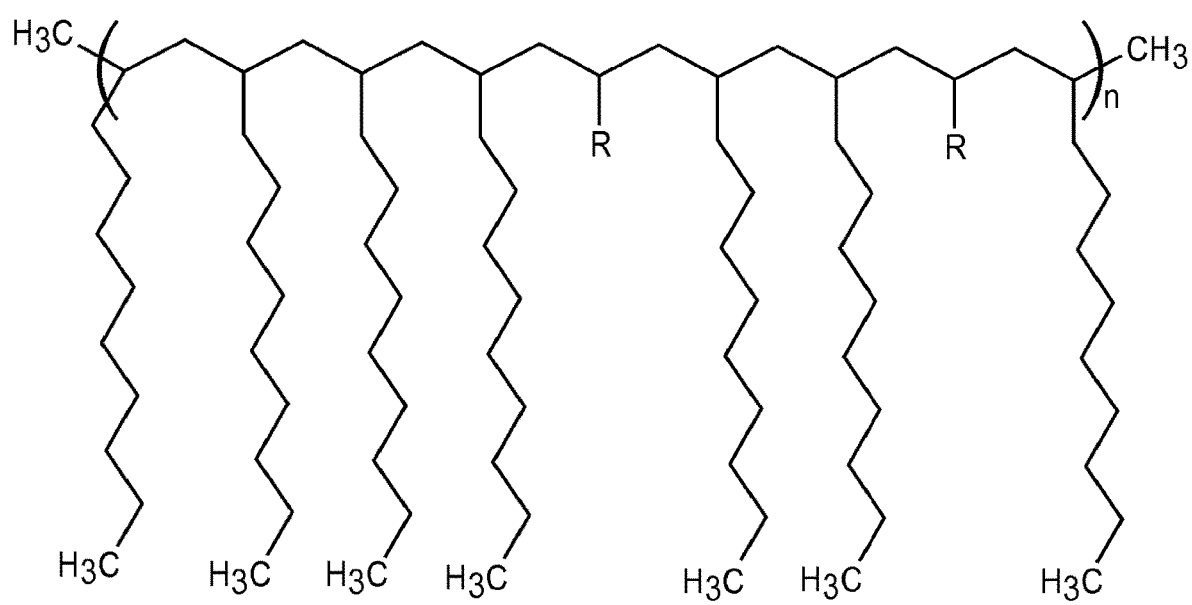
FIG. 1c shows a representative example of an FP-PCM based on a polyolefin backbone with crystallizable side chains based on long chain alky groups where R=reactive functional groups.

Definitions—The following definitions apply to various elements described with respect to various aspects of the invention. These definitions may likewise be expanded upon herein.

As used herein, the term "monodisperse" refers to being substantially uniform with respect to a set of properties. Thus, for example, a set of microcapsules that are monodisperse can refer to such microcapsules that have a narrow distribution of sizes around a mode of the distribution of sizes, such as a mean of the distribution of sizes. A further example is a set of polymer molecules with similar molecular weights.

As used herein, the term "latent heat" refers to an amount of heat absorbed or released by a material as it undergoes a transition between two states. Thus, for example, a latent heat can refer to an amount of heat that is absorbed or released as a material undergoes a transition between a liquid state and a crystalline solid state, a liquid state and a gaseous state, a crystalline solid state and a gaseous state, two crystalline solid states or crystalline state and amorphous state.

As used herein, the term "transition temperature" refers to an approximate temperature at which a material undergoes a transition between two states. Thus, for example, a transition temperature can refer to a temperature at which a material undergoes a transition between a liquid state and a crystalline solid state, a liquid state and a gaseous state, a crystalline solid state and a gaseous state, two crystalline solid states or crystalline state and amorphous state . . . A temperature at which an amorphous material undergoes a transition between a glassy state and a rubbery state may also be referred to as a "glass transition temperature" of the material.

As used herein, the term "phase change material" refers to a material that has the capability of absorbing or releasing heat to adjust heat transfer at or within a temperature stabilizing range. A temperature stabilizing range can include a specific transition temperature or a range of transition temperatures. In some instances, a phase change material can be capable of inhibiting heat transfer during a period of time when the phase change material is absorbing or releasing heat, typically as the phase change material undergoes a transition between two states. This action is typically transient and will occur until a latent heat of the phase change material is absorbed or released during a heating or cooling process. Heat can be stored or removed from a phase change material, and the phase change material typically can be effectively recharged by a source emitting or absorbing it. For certain implementations, a phase change material can be a mixture of two or more materials. By selecting two or more different materials and forming a mixture, a temperature stabilizing range can be adjusted for any desired application. The resulting mixture can exhibit two or more different transition temperatures or a single modified transition temperature when incorporated in the articles described herein.

As used herein, the term "polymer" refers to a material that includes a set of macromolecules. Macromolecules included in a polymer can be the same or can differ from one another in some fashion. A macromolecule can have any of a variety of skeletal structures, and can include one or more types of monomeric units. In particular, a macromolecule can have a skeletal structure that is linear or non-linear. Examples of non-linear skeletal structures include branched skeletal structures, such those that are star branched, comb branched, or dendritic branched, and network skeletal structures. A macromolecule included in a homopolymer typically includes one type of monomeric unit, while a macromolecule included in a copolymer typically includes two or more types of monomeric units. Examples of copolymers include statistical copolymers, random copolymers, alternating copolymers, periodic copolymers, block copolymers, radial copolymers, and graft copolymers. In some instances, a reactivity and a functionality of a polymer can be altered by addition of a set of functional groups, such as acid anhydride groups, amino groups and their salts, N-substituted amino groups, amide groups, carbonyl groups, carboxy groups and their salts, cyclohexyl epoxy groups, epoxy groups, glycidyl groups, hydroxy groups, isocyanate groups, urea groups, aldehyde groups, ester groups, ether groups, alkenyl groups, alkynyl groups, thiol groups, disulfide groups, silyl or silane groups, groups based on glyoxals, groups based on aziridines, groups based on active methylene compounds or other b-dicarbonyl compounds (e.g., 2,4-pentandione, malonic acid, acetylacetone, ethylacetone acetate, malonamide, acetoacetamide and its methyl analogues, ethyl acetoacetate, and isopropyl acetoacetate), halo groups, hydrides, or other polar or H bonding groups and combinations thereof. Such functional groups can be added at various places along the polymer, such as randomly or regularly dispersed along the polymer, at ends of the polymer, on the side, end or any position on the crystallizable side chains, attached as separate dangling side groups of the polymer, or attached directly to a backbone of the polymer. Also, a polymer can be capable of cross-linking, entanglement, or hydrogen bonding in order to increase its mechanical strength or its resistance to degradation under ambient or processing conditions. As can be appreciated, a polymer can be provided in a variety of forms having different molecular weights, since a molecular weight of the polymer can be dependent upon processing conditions used for forming the polymer. Accordingly, a polymer can be referred to as having a specific molecular weight or a range of molecular weights. As used herein with reference to a polymer, the term "molecular weight" can refer to a number average molecular weight, a weight average molecular weight, or a melt index of the polymer.

Examples of polymers (including those polymers used for crosslinkers and binders) include polyhydroxyalkonates, polyamides, polyamines, polyimides, polyacrylics (e.g., polyacrylamide, polyacrylonitrile, and esters of methacrylic acid and acrylic acid), polycarbonates (e.g., polybisphenol A carbonate and polypropylene carbonate), polydienes (e.g., polybutadiene, polyisoprene, and polynorbornene), polyepoxides, polyesters (e.g., polycaprolactone, polyethylene adipate, polybutylene adipate, polypropylene succinate, polyesters based on terephthalic acid, and polyesters based on phthalic acid), polyethers (e.g., polyethylene glycol or polyethylene oxide, polybutylene glycol, polypropylene oxide, polyoxymethylene or paraformaldehyde, polytetramethylene ether or polytetrahydrofuran, and polyepichlorohydrin), polyfluorocarbons, formaldehyde polymers (e.g., urea-formaldehyde, melamine-formaldehyde, and phenol formaldehyde), natural polymers (e.g., polysaccharides, such as cellulose, chitan, chitosan, and starch; lignins; proteins; and waxes), polyolefins (e.g., polyethylene, polypropylene, polybutylene, polybutene, and polyoctene), polyphenylenes, silicon-containing polymers (e.g., polydimethyl siloxane and polycarbomethyl silane), polyurethanes, polyvinyls (e.g., polyvinyl butyral, polyvinyl alcohol, esters and ethers of polyvinyl alcohol, polyvinyl acetate, polystyrene, polymethylstyrene, polyvinyl chloride, polyvinyl pryrrolidone, polymethyl vinyl ether, polyethyl vinyl ether, and polyvinyl methyl ketone), polyacetals, polyarylates, alkyd-based polymers (e.g., polymers based on glyceride oil), copolymers (e.g., polyethylene-co-vinyl acetate and polyethylene-co-acrylic acid), and mixtures thereof. The term polymer is meant to be construed to include any substances that become available after the filing of this application and that exhibit the general polymeric properties described above.

As used herein, the term "chemical bond" and its grammatical variations refer to a coupling of two or more atoms based on an attractive interaction, such that those atoms can form a stable structure. Examples of chemical bonds include covalent bonds and ionic bonds. Other examples of chemical bonds include hydrogen bonds and attractive interactions between carboxy groups and amine groups.

As used herein, the term "molecular group" and obvious variations thereof, refers to a set of atoms that form a portion of a molecule. In some instances, a group can include two or more atoms that are chemically bonded to one another to form a portion of a molecule. A group can be neutral on the one hand or charged on the other, e.g., monovalent or polyvalent (e.g., bivalent) to allow chemical bonding to a set of additional groups of a molecule. For example, a monovalent group can be envisioned as a molecule with a set of hydride groups removed to allow chemical bonding to another group of a molecule. A group can be neutral, positively charged, or negatively charged. For example, a positively charged group can be envisioned as a neutral group with one or more protons (i.e., H+) added, and a negatively charged group can be envisioned as a neutral group with one or more protons removed. A group that exhibits a characteristic reactivity or other set of properties can be referred to as a functional group, reactive function or reactive functional groups. Examples of reactive functional groups include such as acid anhydride groups, amino groups, N-substituted amino groups and their salts, amide groups, carbonyl groups, carboxy groups and their salts, cyclohexyl epoxy groups, epoxy groups, glycidyl groups, hydroxy groups, isocyanate groups, urea groups, aldehyde groups, ester groups, ether groups, alkenyl groups, alkynyl groups, thiol groups, disulfide groups, silyl or silane groups, groups based on glyoxals, groups based on aziridines, groups based on active methylene compounds or other b-dicarbonyl compounds (e.g., 2,4-pentanedione, malonic acid, acetylacetone, ethylacetone acetate, malonamide, acetoacetamide and its methyl analogues, ethyl acetoacetate, and isopropyl acetoacetate), halo groups, hydrides, or other polar or H bonding groups and combinations thereof.

As used herein, the term "covalent bond" means a form of chemical bonding that is characterized by the sharing of pairs of electrons between atoms, or between atoms and other covalent bonds. Attraction-to-repulsion stability that forms between atoms when they share electrons is known as covalent bonding. Covalent bonding includes many kinds of interactions, including σ-bonding, π-bonding, metal-metal bonding, agostic interactions, and three-center two-electron bonds.

Figure 4:
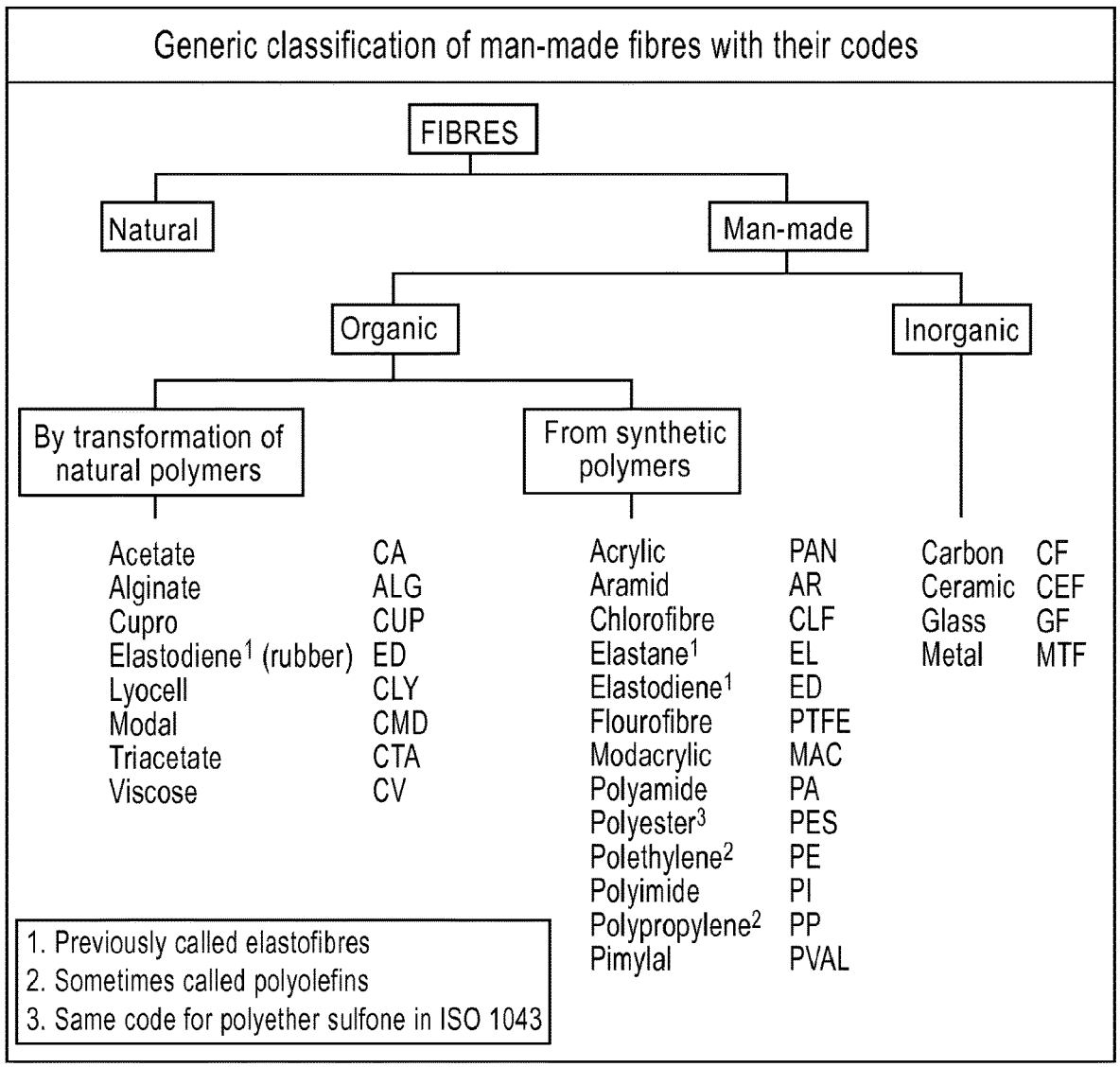
FIG. 4 is a chart depicting the generic classifications of man-made fibers which can incorporate FP-PCM or be made into wovens, knits, nonwoven or other substrates which can be treated with FP-PCM.

The reactive function could be of various chemical natures. For example, reactive functions capable of reacting and forming electrovalent bonds or covalent bonds with reactive functions of various substrates, e.g. cotton, wool, fur, leather, polyester and textiles made from such materials, as well as other base materials. For example, materials made from natural, regenerated or synthetic polymers/fibers/materials may form a electrovalent bond. Further examples of such substrates include various types of natural products including animal products such as alpaca, angora, camel hair, cashmere, catgut, chiengora, llama, mohair, silk, sinew, spider silk, wool, and protein based materials, various types of vegetable based products such as bamboo, coir, cotton, flax, hemp, jute, kenaf, manila, piña, raffia, ramie, sisal, and cellulose based materials; various types of mineral based products such as asbestos, basalt, mica, or other natural inorganic fibers. Generally, man-made fibers are classified into three classes, those made from natural polymers, those made from synthetic polymers and those made from inorganic materials. FIG. 4 depicts the generic classification of man made fibers with their International Bureau for the Standardization of Man-Made Fibres (BISFA) codes. A general description follows.

Fibers from Natural Polymers—The most common natural polymer fibre is viscose, which is made from the polymer cellulose obtained mostly from farmed trees. Other cellulose-based fibers are cupro, acetate and triacetate, lyocell and modal. The production processes for these fibers are given within this disclosure. Less common natural polymer fibers are made from rubber, alginic acid and regenerated protein.

Fibers from Synthetic Polymers—There are very many synthetic fibers, i.e. organic fibers based on petrochemicals. The most common are polyester, polyamide (often called nylon), acrylic and modacrylic, polypropylene, the segmented polyurethanes which are elastic fibers known as elastanes (or spandex in the USA), and specialty fibers such as the high performance aramids.

Fibers from Inorganic Materials—The inorganic man-made fibers are fibers made from materials such as glass, metal, carbon or ceramic. These fibers are very often used to reinforce plastics to form composites.

Examples of suitable reactive functional groups include functional groups such as acid anhydride groups, amino groups, N-substituted amino groups and their salts, amide groups, carbonyl groups, carboxy groups and their salts, cyclohexyl epoxy groups, epoxy groups, glycidyl groups, hydroxy groups, isocyanate groups, urea groups, aldehyde groups, ester groups, ether groups, alkenyl groups, alkynyl groups, thiol groups, disulfide groups, silyl or silane groups, groups based on glyoxals, groups based on aziridines, groups based on active methylene compounds or other b-dicarbonyl compounds (e.g., 2,4-pentandione, malonic acid, acetylacetone, ethylacetone acetate, malonamide, acetoacetamide and its methyl analogues, ethyl acetoacetate, and isopropyl acetoacetate), halo groups, hydrides, or other polar or H bonding groups and combinations thereof.

Further details of the variety of examples of reactive functions and functional groups that may be used in accordance with one or more aspects of the present invention can be found in commonly owned and co-pending patent application Ser. Nos. 12/174,607 and 12/174,609, the details of which have been incorporated by reference into this disclosure. It should be clearly understood that by providing examples of specific compositions and methods in the later part of this description, applicant does not intend to limit the scope of the claims to any of those specific composition. To the contrary, it is anticipated that any combination of the functional groups, polymeric phase change materials, and articles described herein may be utilized to achieve the novel aspects of the present invention. The claims are not intended to be limited to any of the specific compounds described in this disclosure or any disclosure incorporated herein.

Several publications referenced herein deal with polymeric PCMs (P-PCM), which in a way, present an intermediate case between the solid-liquid PCMs and the solid-solid PCMs. P-PCMs are solid both prior to phase change and after it. The difference is in their degree of structure. At lower temperatures, that degree is greater than that at the elevated temperature, so that at a temperature of phase change, P-PCM converts from the more structured form into its less structured one. Typically, in the more structures form, some sections of the polymer are better aligned and more closely compacted. The better aligned sections resemble crystallites. Therefore, the phase change on heating P-PCM is also referred to as change from a more crystallized form to a less crystallized form. Differently put, at the elevated temperatures (above the transition temperature), P-PCMs are essentially amorphous. At the lower temperatures (below the transition temperature) they have a degree of crystallinity. Similarly, the changes on heat absorption and on heat release could be referred to as decrystallization and recrystallization, respectively. The related enthalpy could also be referred to as enthalpy of decrystallization.

Typically, P-PCMs have sections that are capable of being better aligned and more closely compacted. Such sections could be referred to as crystallizable sections. In some embodiments, the functional polymeric PCM described herein in accordance with various aspects of the present invention comprises at least one such crystallizable section. According to an embodiment of the invention, the polymer comprises a backbone and side chains. Preferably, the side chains form a crystallizable section.

As used here, the term "reactive function" means a chemical group (or a moiety) capable of reacting with another chemical group to form a covalent or an electrovalent bond, examples of which are given above. Preferably, such reaction is doable at relatively low temperatures, e.g. below 200° C., more preferably below 100° C., and at conditions suitable to handle delicate substrates, e.g. textile. As used herein the term "carrying a function" and obvious variations of this term, means having a function bound to it, e.g. covalently or electrovalently.

The reactive function could be placed on (carried on or covalently bound or electrovalently bonded to) any part of the FP-PCM molecule, e.g. on a side chain, along the backbone chain or on at least one of the ends of the backbone chain or side chain. According to various embodiments of the invention, the FP-PCM comprises multiple reactive functions and those functions are spread at substantially regular intervals, stereospecifically or randomly along the molecule, e.g. along the backbone chain. Any combination of these is also possible.

The molecular weight of FP-PCM of the present invention is preferably of at least 500 Daltons, more preferably at least 2000 Daltons. Preferably the weight of the crystallizable section forms at least 20%, more preferably at least 50%, and most preferably at least 70% of the total weight of the FP-PCM.

The FP-PCM of the present invention has a single phase change temperature or multiple such temperatures. According to one embodiment, the FP-PCM has at least one phase change temperature in the range between −10° C. and 100° C., preferably between 10° C. and 60° C. and a phase change enthalpy of at least 25 J/g.

The phase change at each of the temperatures has its own enthalpy, so that according to some of the embodiments, the article has a single phase change enthalpy and, according to other embodiments, multiple such enthalpies. As used herein, the term "overall phase change enthalpy" refers to the enthalpy of phase change in the case of article with a single phase change temperature and to the combined enthalpies in case of multiple phase change temperatures. According to an embodiment of the invention, the article has an overall phase change enthalpy of at least 2.0 Joules/gram (J/g) or 10 J/m².

While each of the FP-PCM molecules carries at least one reactive function, large FP-PCM molecules may carry multiple reactive functions. According to an embodiment of the invention, an FP-PCM carries at least one reactive function per 10,000 Daltons of the molecular weight and preferably two reactive functions.

As indicated, the reactive function of the FP-PCM of the present invention should be capable of forming covalent or electrovalent bonds with various articles, compounds and other molecules, commonly referred to here as base materials or substrates. According to another embodiment, substrates are selected from a group consisting of cotton, wool, fur, leather, polyester and textiles made from such materials. Examples of reactive functions capable of forming covalent bonds are acid anhydride groups, amino groups, N-substituted amino groups, carbonyl groups, carboxy groups, cyclohexyl epoxy groups, epoxy groups, glycidyl groups, hydroxy groups, isocyanate groups, urea groups, aldehyde groups, ester groups, ether groups, alkenyl groups, alkynyl groups, thiol groups, disulfide groups, silyl or silane groups, groups based on glyoxals, groups based on aziridines, groups based on active methylene compounds or other b-dicarbonyl compounds (e.g., 2,4-pentandione, malonic acid, acetylacetone, ethylacetone acetate, malonamide, acetoacetamide and its methyl analogues, ethyl acetoacetate, and isopropyl acetoacetate), halo groups, hydrides, or and combinations thereof. FP-PCMs capable of forming covalent bonds are disclosed in commonly assigned U.S. patent application Ser. No. 12/174,607, the teaching of which is incorporated herein by reference in its entirety. Examples of reactive functions capable of forming electrovalent bonds are acid functions, basic functions, positively charged complexes and negatively charged complexes. FP-PCM capable of forming electrovalent bonds such as disclosed in commonly assigned U.S. patent application Ser. No. 12/174,609, the teaching of which is incorporated herein by reference in its entirety.

According to another embodiment of the invention, the article forming the substrate further comprises at least one other ingredient. Suitable ingredients may be selected from a group consisting of another FP-PCM, another PCM, microcapsules comprising PCM, microcapsules with other additives, binders, crosslinkers, blending polymers, compatibilizers, wetting agents, and additives. The FP-PCM may also be bound to the at least one other ingredient.

According to another embodiment, the functional polymeric phase change material is chemically bound to the substrate. Binding may be one of covalent binding, electrovalent binding, direct binding, or binding via a connecting compound. According to another embodiment, binding is such as the one resulting from a reaction between a reactive function of the FP-PCM and a reactive function of the substrate, preferably the binding is a result of such reaction. The substrate can be selected from the group consisting of textiles such as natural fibers, fur, synthetic fibers, regenerated fibers, woven fabric, knit fabric, nonwoven fabric, foams, paper, leather, plastic or polymeric layers such as plastic films, plastic sheets, laminates or combinations of above.

Textiles described herein can be used for any garment or article that comes in contact with a human or animal body. This includes hats, helmets, glasses, goggles, masks, scarves, shirts, baselayers, vests, jackets, underwear, lingerie, bras, gloves, liners, mittens, pants, overalls, bibs, socks, hosiery, shoes, boots, insoles, sandals, bedding, sleeping bags, blankets, mattresses, sheets, pillows, textile insulation, backpacks, sports pads/padding, etc. The textile article can contain the FP-PCM or can be coated, laminated or molded. For instance, fibers can be manufactured with the FP-PCM contained in the fiber, coated onto the fiber or treated in which the fiber and FP-PCM interact. This is applicable also to any step in a textile manufacturing process.

Articles described herein can be used in conjunction with one or more of the following categories of products and articles:

Shipping, storage or packaging containers/equipment such as paper, glass, metal, plastic, ceramic, organic or inorganic materials in the form of envelopes, sleeves, labels, cardboard, wrapping, wires, tiedowns, insulation, cushioning, pads, foams, tarps, bags, boxes, tubes, containers, sheet, film, pouches, suitcases, cases, packs, bottles, jars, lids, covers, cans, jugs, glasses, tins, pails, buckets, baskets, drawers, drums, barrels, tubs, bins, hoppers, totes, truck/ship containers or trailers, carts, shelves, racks, etc. These articles can especially be used in the food shipment, food delivery, medical shipment, medical delivery, body shipment, etc. industries.

Medical, health, therapeutic, curative, and wound management articles such as bandages, wraps, wipes, stents, capsules, drug, delivery devices, tubes, bags, pouches, sleeves, foams, pads, sutures, wires, etc.

Building, construction, and interior articles where energy management and off-peak energy demand reduction is desired. These articles can include such as upholstery, furniture, beds, furnishings, windows, window coatings, window treatments and coverings, wallboard, insulation, foams, piping, tubes, wiring, laminates, bricks, stones, siding, panels for wall or ceiling, flooring, cabinets, building envelopes, building wrap, wallpaper, paint, shingles, roofing, frames, etc. The use of alternative construction techniques and such articles are also included as straw bale construction, mud or adobe construction, brick or stone construction, metal container construction, etc.

Electronics and electrical articles such as conductors, heat sinks, semiconductors, transistors, integrated circuits, wiring, switches, capacitors, resistors, diodes, boards, coverings, motors, engines, etc.

Articles for use in industries such as automotive, heavy equipment, trucking, food/beverage delivery, cosmetics, civil service, agriculture, hunting/fishing, manufacturing, etc. which incorporate articles described above.

Cosmetics such as creams, lotions, shampoos, conditioners, bodywash, soaps, hair gels, mousse, lipstick, deodorant, moisturizers, nail polish, glosses, lipsticks, makeup, eyeliners/eyeshadow, foundations, blushes, mascara, etc.

Controlled release articles in which the FP-PCM creates a barrier when in one phase and allows movement when in another phase. The barrier can be due to trapping of the material within the FP-PCM crystalline domain matrix or physical layers between the materials, etc. This phase shift to change the barrier characteristics can be triggered by energy such as light, UV, IR, heat, thermal, plasma, sound, microwave, radiowave, pressure, x-ray, gamma, or any form of radiation or energy. The barrier can prevent movement of or release of such as materials, colors or energy. A further example is a barrier to liquid materials or the blocking/unblocking of light or color, the change of stiffness or flexibility at various temperatures, etc. Further examples are the containment/release of catalysts, chemical reaction control agents (increase or decrease reaction), adhesion, enzymes, dyes, colors, stabilizers for or against light and/or temperature, nano or microparticles, temperature or fraud markers, etc.

In addition, the FP-PCM can be incorporated into articles as outlined in the following commonly assigned patents: For coating, such as in U.S. Pat. No. 5,366,801, Fabric with Reversible Enhanced Thermal Properties; U.S. Pat. No. 6,207,738, Fabric Coating Composition Containing Energy Absorbing Phase Change Material; U.S. Pat. No. 6,503,976, Fabric Coating Composition Containing Energy Absorbing Phase Change Material and Method of Manufacturing Same; U.S. Pat. No. 6,660,667, Fabric Coating Containing Energy Absorbing Phase Change Material and Method of Manufacturing Same; U.S. Pat. No. 7,135,424, Coated Articles Having Enhanced Reversible Thermal Properties and Exhibiting Improved Flexibility, Softness, Air Permeability, or Water Vapor Transport Properties; U.S. application Ser. No. 11/342,279, Coated Articles Formed of Microcapsules with Reactive Functional Groups.

For Fibers such as in U.S. Pat. No. 4,756,958, Fiber with Reversible Enhanced Thermal Storage Properties and Fabrics Made Therefrom; U.S. Pat. No. 6,855,422, Multi-Component Fibers Having Reversible Thermal Properties; U.S. Pat. No. 7,241,497, Multi-Component Fibers Having Reversible Thermal Properties; U.S. Pat. No. 7,160,612, Multi-Component Fibers Having Reversible Thermal Properties; U.S. Pat. No. 7,244,497, Cellulosic Fibers Having Enhanced Reversible Thermal Properties and Methods of Forming Thereof.

For Fibers, laminates, extruded sheet/film or molded goods, such as in U.S. Pat. No. 6,793,85, Melt Spinable Concentrate Pellets Having Enhanced Reversible Thermal Properties; U.S. application Ser. No. 11/078,656, Polymeric composites having enhanced reversible thermal properties and methods of forming thereof; PCT App. No. PCT/US07/71373, Stable Suspensions Containing Microcapsules and Methods for Preparation Thereof.

These embodiments and articles can be used in any application where temperature regulation, temperature buffering, temperature control or latent heat of fusion is utilized, or any phase transition phenomenon is employed. These applications may or may not be used in conjunction with hydrophilic properties, hydrophobic properties, moisture absorbing, moisture releasing, organic materials absorption or release, inorganic materials absorption or release, crosslinking, anti-microbial, anti-fungal, anti-bacterial, biodegradability, decomposition, anti-odor, odor controlling, odor releasing, grease and stain resistance, stabilization for oxidation or ageing, fire retardant, anti-wrinkle, enhanced rigidity or flexibility, UV or IR screening, impact resistance or control, color addition, color change, color control, catalytic or reaction control, sound, light, optical, static or energy management, surface tension, surface smoothness, or surface properties control, anti-fraud or brand marking control, controlled release/containment, or controlled barrier properties, etc.

In accordance with another aspect a method is provided for the production of an article described herein, comprising providing a FP-PCM, providing a substrate and combining the FP-PCM with the substrate. According to one embodiment, the substrate carries at least one reactive function and the combining comprises chemically reacting a functional group of the FP-PCM with a functional group of the substrate.

According to another aspect, a precursor for the production of the article is provided, which precursor comprises a functional polymeric phase change material and at least one other ingredient.

According to another aspect, a method for the production of the article comprises providing a precursor, providing a substrate, and combining the FP-PCM of the precursor with the substrate. The substrate may carry at least one reactive function. Combining the FP-PCM of the precursor with the substrate comprises chemically reacting a functional group of the FP-PCM with a functional group of the substrate.

The selection of a material forming the substrate may be dependent upon various considerations, such as its affinity to the FP-PCM, its ability to reduce or eliminate heat transfer, its breathability, its drapability, its flexibility, its softness, its water absorbency, its film-forming ability, its resistance to degradation under ambient or processing conditions, and its mechanical strength. In particular, for certain implementations, a material forming the substrate can be selected so as to include a set of functional groups, such as acid anhydride groups, aldehyde groups, amino groups, N-substituted amino groups, carbonyl groups, carboxy groups, epoxy groups, ester groups, ether groups, glycidyl groups, hydroxy groups, isocyanate groups, thiol groups, disulfide groups, silyl groups, groups based on glyoxals, groups based on aziridines, groups based on active methylene compounds or other b-dicarbonyl compounds (e.g., 2,4-pentandione, malonic acid, acetylacetone, ethylacetone acetate, malonamide, acetoacetamide and its methyl analogues, ethyl acetoacetate, and isopropyl acetoacetate), or combinations thereof. At least some of these functional groups can be exposed on a top surface of the substrate and can allow chemical bonding to a set of complementary functional groups included in the embodiments and additives, thereby enhancing durability of the article during processing or during use. Thus, for example, the substrate can be formed of cellulose and can include a set of hydroxy groups, which can chemically bond to a set of carboxy groups included in the FP-PCM. As another example, the substrate can be a proteinacous material and can be formed of silk or wool and can include a set of amino groups, which can chemically bond to those carboxy groups included in the FP-PCM. As can be appreciated, chemical bonding between a pair of functional groups can result in the formation of another functional group, such as an amide group, an ester group, an ether group, an urea group, or an urethane group. Thus, for example, chemical bonding between a hydroxy group and a carboxy group can result in the formation of an ester group, while chemical bonding between an amino group and a carboxy group can result in the formation of an amide group.

For certain implementations, a material forming the substrate can initially lack a set of functional groups, but can be subsequently modified so as to include those functional groups. In particular, the substrate can be formed by combining different materials, one of which lacks a set of functional groups, and another one of which includes those functional groups. These different materials can be uniformly mixed or can be incorporated in separate regions or separate sub-layers. For example, the substrate can be formed by combining polyester fibers with a certain amount (e.g., 25 percent by weight or more) of cotton or wool fibers that include a set of functional groups. The polyester fibers can be incorporated in an outer sub-layer, while the cotton or wool fibers can be incorporated in an inner sub-layer, adjacent to other layers. As another example, a material forming the substrate can be chemically modified so as to include a set of functional groups. Chemical modification can be performed using any suitable technique, such as using oxidizers, corona treatment, or plasma treatment. Chemical modification can also be performed as described in the patent of Kanazawa, U.S. Pat. No. 6,830,782, entitled "Hydrophilic Polymer Treatment of an Activated Polymeric Material and Use Thereof," the disclosure of which is incorporated herein by reference in its entirety. In some instances, a material forming the substrate can be treated so as to form radicals that can react with monomers including a set of functional groups. Examples of such monomers include those with anhydride groups (e.g., maleic anhydride), those with carboxy groups (e.g., acrylic acid), those with hydroxy groups (e.g., hydroxylethyl acrylate), and those with epoxy or glycidyl groups (e.g., glycidyl methacrylate). In other instances, a material forming the substrate can be treated with a set of functional materials to add a set of functional groups as well as to provide desirable moisture management properties. These functional materials can include hydrophilic polymers, such as polyvinyl alcohol, polyglycols, polyacrylic acid, polymethacrylic acid, hydrophilic polyesters, and copolymers thereof. For example, these functional materials can be added during a fiber manufacturing process, during a fabric dyeing process, or during a fabric finishing process. Alternatively, or in conjunction, these functional materials can be incorporated into a fabric via exhaust dyeing, pad dyeing, or jet dyeing.

The FP-PCM can be implemented as a coating, laminate, infusion, treatment or ingredient in a coating, laminate, infusion, treatment that is formed adjacent to, on or within the substrate using any suitable coating, laminating, infusion, etc. technique. During use, the FP-PCM can be positioned so that it is adjacent to an internal compartment or an individual's skin, thus serving as an inner coating. It is also contemplated that the FP-PCM can be positioned so that it is exposed to an outside environment, thus serving as an outer coating. The FP-PCM covers at least a portion of the substrate. Depending on characteristics of the substrate or a specific coating technique that is used, the FP-PCM can penetrate below the top surface and permeate at least a portion of the substrate. While two layers are described, it is contemplated that the article can include more or less layers for other implementations. In particular, it is contemplated that a third layer can be included so as to cover at least a portion of a bottom surface of the substrate. Such a third layer can be implemented in a similar fashion as the FP-PCM or can be implemented in another fashion to provide different functionality, such as water repellency, stain resistance, stiffness, impact resistance, etc.

In one embodiment, the FP-PCM is blended with a binder which may also contain a set of microcapsules that are dispersed in the binder. The binder can be any suitable material that serves as a matrix within which the FP-PCM and possibly also the microcapsules are dispersed, thus offering a degree of protection to the FP-PCM and microcapsules against ambient or processing conditions or against abrasion or wear during use. For example, the binder can be a polymer or any other suitable medium used in certain coating, laminating, or adhesion techniques. For certain implementations, the binder is desirably a polymer having a glass transition temperature ranging from about −110° C. to about 100° C., more preferably from about −110° C. to about 40° C. While a polymer that is water soluble or water dispersible can be particularly desirable, a polymer that is water insoluble or slightly water soluble can also be used as the binder for certain implementations.

The selection of the binder can be dependent upon various considerations, such as its affinity for the FP-PCM and/or microcapsules or the substrate, its ability to reduce or eliminate heat transfer, its breathability, its drapability, its flexibility, its softness, its water absorbency, its coating-forming ability, its resistance to degradation under ambient or processing conditions, and its mechanical strength. In particular, for certain implementations, the binder can be selected so as to include a set of functional groups, such as acid anhydride groups, amino groups and their salts, N-substituted amino groups, amide groups, carbonyl groups, carboxyl groups and their salts, cyclohexyl epoxy groups, epoxy groups, glycidyl groups, hydroxyl groups, isocyanate groups, urea groups, aldehyde groups, ester groups, ether groups, alkenyl groups, alkynyl groups, thiol groups, disulfide groups, silyl or silane groups, groups based on glyoxals, groups based on aziridines, groups based on active methylene compounds or other b-dicarbonyl compounds (e.g., 2,4-pentandione, malonic acid, acetylacetone, ethylacetone acetate, malonamide, acetoacetamide and its methyl analogues, ethyl acetoacetate, and isopropyl acetoacetate), halo groups, hydrides, or other polar or H bonding groups and combinations thereof.

These functional groups can allow chemical bonding to a complementary set of functional groups included in either of, or any of, the FP-PCM, the microcapsules and the substrate, thereby enhancing durability of the article during processing or during use. Thus, for example, the binder can be a polymer that includes a set of epoxy groups, which can chemically bond to a set of carboxy groups included in the FP-PCM and/or the microcapsules. As another example, the binder can be a polymer that includes a set of isocyanate groups or a set of amino groups, which can chemically bond with those carboxy groups included in the FP-PCM, microcapsules, or substrate.

In some instances, a set of catalysts can be added when forming the coating composition. Such catalysts can facilitate chemical bonding between complementary functional groups, such as between those included in the binder and those included in the microcapsules. Examples of materials that can be used as catalysts include boron salts, hypophosphite salts (e.g., ammonium hypophosphite and sodium hypophosphite), phosphate salts, tin salts (e.g., salts of Sn.sup.+2 or Sn.sup.+4, such as dibutyl tin dilaurate and dibutyl tin diacetate), and zinc salts (e.g., salts of Zn.sup.+2). A desirable amount of a tin salt or a zinc salt that is added to the coating composition can range from about 0.001 to about 1.0 percent by dry weight, such as from about 0.01 to about 0.1 percent by dry weight. A desirable amount of a boron salt or a phosphate salt that is added to the coating composition can range from about 0.1 to about 5 percent by dry weight, such as from about 1 to about 3 percent by dry weight. Other examples of materials that can be used as catalysts include alkylated metals, metal salts, metal halides, and metal oxides, where suitable metals include Sn, Zn, Ti, Zr, Mn, Mg, B, Al, Cu, Ni, Sb, Bi, Pt, Ca, and Ba. Organic acids and bases, such as those based on sulfur (e.g., sulfuric), nitrogen (e.g., nitric), phosphorous (e.g., phosphoric), or halides (e.g., F, Cl, Br, and I), can also be used as catalyst. Further examples of materials that can be used as catalysts include acids such as citric acid, itaconic acid, lactic acid, fumaric acid, and formic acid.

Bonds between substrate, functional phase change material, binder and/or microcapsules are, according to various embodiments, covalent, electrovalent or various combinations of those. Binding could be direct or indirect, e.g. via a connecting compound. According to some embodiments, the connecting compound is selected from a group consisting of functional polymeric phase change material and microcapsules. According to another embodiment, the functional polymeric phase change material forms a binder for at least a portion of a second PCM.

According to another embodiment, the reactive function of the FP-PCM can be converted into another reactive function, which is more suitable for reacting with particular substrates.

According to another embodiment, the reactive function of the FP-PCM could be of various chemical nature. For example, reactive functions capable of reacting and forming covalent or electrovalent bonds with reactive functions of various substrates, e.g. cotton, wool, fur leather, polyester and textiles made from such materials.

According to another embodiment of the invention, the reactive function can be any of the following: 1) glycidyl or epoxy such as from glycidyl methacrylate or glycidyl vinyl ether; 2) anhydride such as from maleic anhydride or itaconic anhydride; 3) isocyanate such as from isocyanato methacrylate, TMI® from Cytec Ind. or blocked isocyanates such as 2-(0-[1'-methylproplyideneamino]carboxyamino) ethyl methacrylate; 4) amino or amine-formaldehyde such as from N-methylolacrylamide; and 5) silane such as from methacryloxypropyltriethoxysilane. Such reactive functions can react with OH functional groups of cellulosic based textiles such as cotton; with amine functional groups of proteinaceous based textiles such as wool, fur or leather; with hydroxyl or carboxyl groups of polyester based textiles and with amide functional groups of nylon functional resins.

According to still another embodiment of the invention, the reactive function is a double bond, capable of binding to another double bond, providing a cross-linking point, etc.

The reactive function of the FP-PCM can assume a positive charge and bind electrovalently with a negative charge on the substrate. According to another embodiment, the reactive function can assume a negative charge and bind electrovalently with a positive charge on the substrate. According to another embodiment, the reactive functions of both the substrate and the FP-PCM and/or microcapsule are negatively charged and binding is via a multivalent cation, which acts as a cross-linker. According to still another embodiment, the reactive functions of both the substrate and the FP-PCM and/or microcapsule are positively charged and binding is via a multivalent anion, which acts as a cross-linker. The cross-linking multivalent cation, anion or both could be organic or inorganic.

An article constructed in accordance with various aspects of the present invention can have a single phase change temperature or multiple phase change temperatures, e.g. in cases wherein the FP-PCM has multiple types of crystallizable sections or cases wherein the article comprises multiple FP-PCMs of different types. An article constructed in accordance with aspects of the present invention has at least one phase change temperature in the range between $-10°$ C. and $100°$ C., preferably between $10°$ C. and $60°$ C. and phase change enthalpy of at least 2.0 Joules/gram (J/g) or 10 J/m$^2$. According to other embodiments, the functional polymeric phase change material comprises hydrophilic crystallizable section, hydrophobic crystallizable section or both. As example, an AB block copolymer, made of segments such as polystearyl methacrylate and polyethylene glycol methacrylate would have two different phase change temperatures and hydrophilic/hydrophobic properties. One phase change temperature from the stearyl hydrophobic crystallizable side chains and another phase change temperature from the glycol hydrophilic crystallizable side chains.

The phase change at each of the temperatures has its own enthalpy, so that the article has according to some of the embodiments a single phase change enthalpy and, according to others, multiple such enthalpies. According to an embodiment of the invention, the article has an overall phase change enthalpy of at least 2.0 Joules/gram (J/g) or 10 J/m$^2$.

According to another aspect, the present invention provides a precursor for the production of an article according to the second aspect, which precursor comprises the functional polymeric phase change material and at least one other ingredient. The one other ingredient is selected from a group consisting of an organic solvent, an aqueous solvent, another FP-PCM, another PCM, microcapsules comprising PCM, microcapsules with other additives, binders, cross-linkers, blending polymers, compatibilizers, wetting agents, catalysts and additives. and their combinations. Examples of precursors are formulations used for the coating, dyeing, dipping, spraying, brushing, padding, printing, etc. of substrates, the predispersion of FP-PCMs for addition to manufacturing lines such as injecting into fiber dope on spin lines, Colorant and tint formulations, additive masterbatches or dispersions, neutralizing or pH adjusting solutions, the formulation of plastic pellets or masterbatches for extrusion and formation of melt spun fibers, molded parts, film, sheets or laminated products. These are described in cited and included Outlast patents and applications above.

According to another embodiment, a method is provided for the production of an article, comprising providing a precursor, providing a substrate and combining the FP-PCM of the precursor with the substrate. The substrate preferably carries at least one reactive function and combining the FP-PCM of the precursor with the substrate comprises chemically reacting a functional group of the FP-PCM with a functional group of the substrate.

Further examples of binders or crosslinkers are polymers, oligomers or molecules with multiple reactive functional groups which can interact or bond with another of the same, another FP-PCM, another PCM, microcapsules comprising PCM, microcapsules with other additives, binders, cross-linkers, blending polymers, compatibilizers, wetting agents, additives, etc. The bonds or interactions can be either covalent or ionic.

For certain implementations, a set of reactive components or modifiers can also be added when forming the composition. Such modifiers can allow cross-linking of the FP-PCM and/or binder to provide improved properties, such as durability and other properties. Examples of materials that can be used as modifiers include polymers, such as melamine-formaldehyde resins, urea-formaldehye resins, polyanhydrides, urethanes, epoxies, acids, polyurea, polyamines or any compound with multiple reactive functional groups. A desirable amount of a modifier that is added to the coating composition can range from about 1 to about 20 percent by dry weight, such as from about 1 to about 5 percent by dry weight. Also, a set of additives can be added when forming the composition. In some instances, these additives can be contained within the microcapsules. For examples of additives include those that improve water absorbency, water wicking ability, water repellency, stain resistance, dirt resistance, and odor resistance. Additional examples of additives include anti-microbials, flame retardants, surfactants, dispersants, and thickeners. Further examples of additives and modifiers are set forth below.

Moisture management, hydrophilic and polar materials—such as including or based on acids, glycols, salts, hydroxy group-containing materials (e.g., natural hydroxy group-containing materials), ethers, esters, amines, amides, imines, urethanes, sulfones, sulfides, natural saccharides, cellulose, sugars and proteins Grease, dirt and stain resistance—such as non-functional, non-polar, and hydrophobic materials, such as fluorinated compounds, silicon-containing compounds, hydrocarbons, polyolefins, and fatty acids.

Anti-microbial, Anti-fungal and Anti-bacterial—such as complexing metallic compounds based on metals (e.g., silver, zinc, and copper), which cause inhibition of active enzyme centers. copper and copper-containing materials (e.g., salts of Cu.+2 and Cu.+), such as those supplied by Cupron Ind., silver and silver-containing materials and monomers (e.g., salts of Ag, Ag.+, and Ag+2), such as supplied as ULTRA-FRESH by Thomson Research Assoc. Inc. and as SANITIZED Silver and Zinc by Clariant Corp. oxidizing agents, such as including or based on aldehydes, halogens, and peroxy compounds that attack cell membranes (e.g., supplied as HALOSHIELD by Vanson HaloSource Inc.) 2,4,4'-trichloro-2'-hydroxy dipenyl ether (e.g., supplied as TRICLOSAN), which inhibits growth of microorganisms by using an electro-chemical mode of action to penetrate and disrupt their cell walls. quaternary ammonium compounds, biguanides, amines, and glucoprotamine (e.g., quaternary ammonium silanes supplied by Aegis Environments or as SANITIZED QUAT T99-19 by Clariant Corp. and biguanides supplied as PURISTA by Avecia Inc.) chitosan castor oil derivatives based on undecylene acid or undecynol (e.g., undecylenoxy polyethylene glycol acrylate or methacrylate).

For certain implementations, the layers can have a loading level of the FP-PCM alone or in combination with microcapsules ranging from about 1 to about 100 percent by dry weight, most preferably from about 10% to about 75%. These FP-PCM, binders, additives and microcapsules can differ from each other or be the same such as by being liquids or solids at room temperature, having different shapes or sizes, by including shells formed of a different material or including different functional groups, or by containing a different phase change material or a combination thereof.

According to another embodiment, an article comprises a substrate and a starch or modified starch. Starch is a polymer, mainly of glucose, has crystallizable sections and carries hydroxyl groups. As such it is suitable as an FP-PCM for use in articles constructed in accordance with aspects of the present invention. In most cases, starch consists of both linear and branched chains. Different starches comprise various degrees of crystallizable sections, as found e.g. in standard differential scanning calorimetry (DSC) analysis. The crystallizable section consists of aligning side chains on the branched starch. Temperature and elevation, optionally combined with increased moisture leads to decrystallization (which is sometimes referred to as gelatinization). At lower temperature (and moisture), recrystallization takes place. Starch is hydrophilic, and, as such, also provides both for extension of the temperature regulating capacity of the FP-PCM and for recharging of the FP-PCM. Another feature of using starch and its derivatives, as well as some other hydrophilic FP-PCMs is the ability to adjust its transition temperature by adjusting its moisture content. Typically, the higher the moisture, the lower is the transition temperature.

According to various embodiments of the invention, various natural starches may be used, including, but not limited to, corn starch, potato starch and wheat starch. According to other embodiments, modified starch may be used, e.g. starch modified specifically for the article of the present invention or commercially available, modified starch. According to further embodiments, such modified starch is a result of acid hydrolysis for lowering its molecular weight (e.g. acid thinning) and/or a result of separating a fraction of it for enrichment in one of amylase or amylopectin. According to other embodiments, the starch to be used as an FP-PCM is chemically modified by attaching to it a new reactive function. According to various other embodiments, the chemically-modified starch is selected from commercially-available, chemically modified starches prepared for applications such as the food industry, the paper industry and others, e.g. hydroxyethyl starch, hydroxypropyl starch, starch acetate, starch phosphate, starch, cationic starches, anionic starches and their combinations. Modified starches and methods of their production are described in Chapter 16 of Corn Chemistry and Technology, edited by Watson and Ramstad, published by American Association of Cereal Chemists Inc., the teaching of which is incorporated herein by reference.

In accordance with one aspect the starch or modified starch is bound to the substrate via a covalent bond. According to another aspect it is bound via an electrovalent bond. According to various other embodiments, the covalently bound starch is selected from a group consisting of natural starch, thinned starch, amylase-enriched starch, amylopectin-enriched starch, hydroxyethyl starch, hydroxypropyl starch, starch acetate, starch phosphate, starch, cationic starches, anionic starches and their combinations. According to other embodiments, the electrovalently bound starch is selected from a group consisting of starch acetate, starch phosphate, starch, cationic starches, anionic starches and their combinations.

An article constructed in accordance with one aspect of the present invention comprises a substrate and at least one of gelatin, gelatin solutions and modified gelatin. Gelatin is a polymer mainly containing repeating sequences of glycine-X-Y-triplets, where X and Y are frequently proline and hydroxyproline amino acids. These sequences are responsible for the triple helical structure of gelatins and their ability to form thermally and reversible gels.

The formation of these phase changing structures are greatly dependent on the molecular weight, molecular structure, degree of branching, gelatin extraction process from collagen, natural source of collagen, temperature, pH, ionic concentration, crosslinks, reactive groups, reactive group modifications, presence of iminoacids, purity, solution concentrations, etc.

Gelatins can provide for latent heat properties as outlined in "Studies of the Cross-Linking Process in Gelatin Gels. III. Dependence of Melting Point on Concentration and Molecular Weight": Eldridge, J. E., Ferry, J. D.; Journal of Physical Chemistry, 58, 1954, pp 992-995.

Gelatin can be easily modified by reaction and crosslinking with many compounds such as crosslinkers and modifiers outlined in above detailed description. Crosslinking agents such as aldehydes where formaldehyde and glutaraldehyde may be used. Isocyanates and anhydrides may be used to both modified the properties of the gelatin and provide for reactive functional groups for bonding to substrates.

Gelatin is hydrophilic, and as such also provides both for extension of the temperature regulating capacity of the FP-PCM and for recharging of the FP-PCM. Another important feature of using gelatins and its derivatives, as well as some other hydrophilic FP-PCM is the ability to adjust its transition temperature by adjusting its moisture content and polymer structure, i.e. molecular weight.

According to one embodiment, in an article, the gelatin or modified gelatin is bound to the substrate in a covalent bond or an electrovalent bond. According to various embodiments the gelatin can be in the form of a solution which is contained within the substrate.

Figure 2:
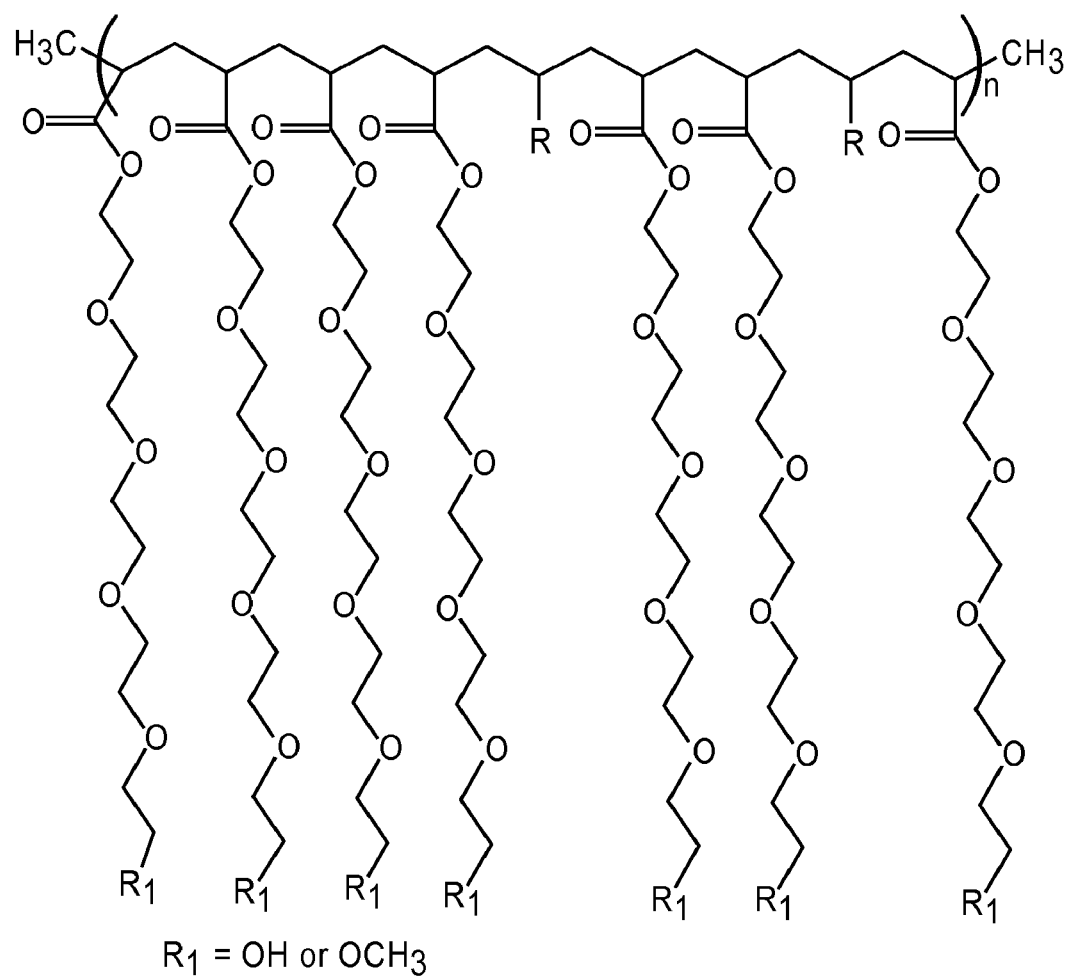

FIGS. 1 and 2 are schematic drawings of FP-PCMs used in accordance with an article constructed in accordance with various aspects of the present invention. Both are composed of a backbone chain and side chains. The FP-PCM in FIG. 1 represent long chain alkyl polyacrylate or polymethacrylate, and 1a-1c where 1a is long chain alkyl vinyl esters, 1b is long chain vinyl ethers and 1c is long chain alkyl olefins.

Figure 2A:
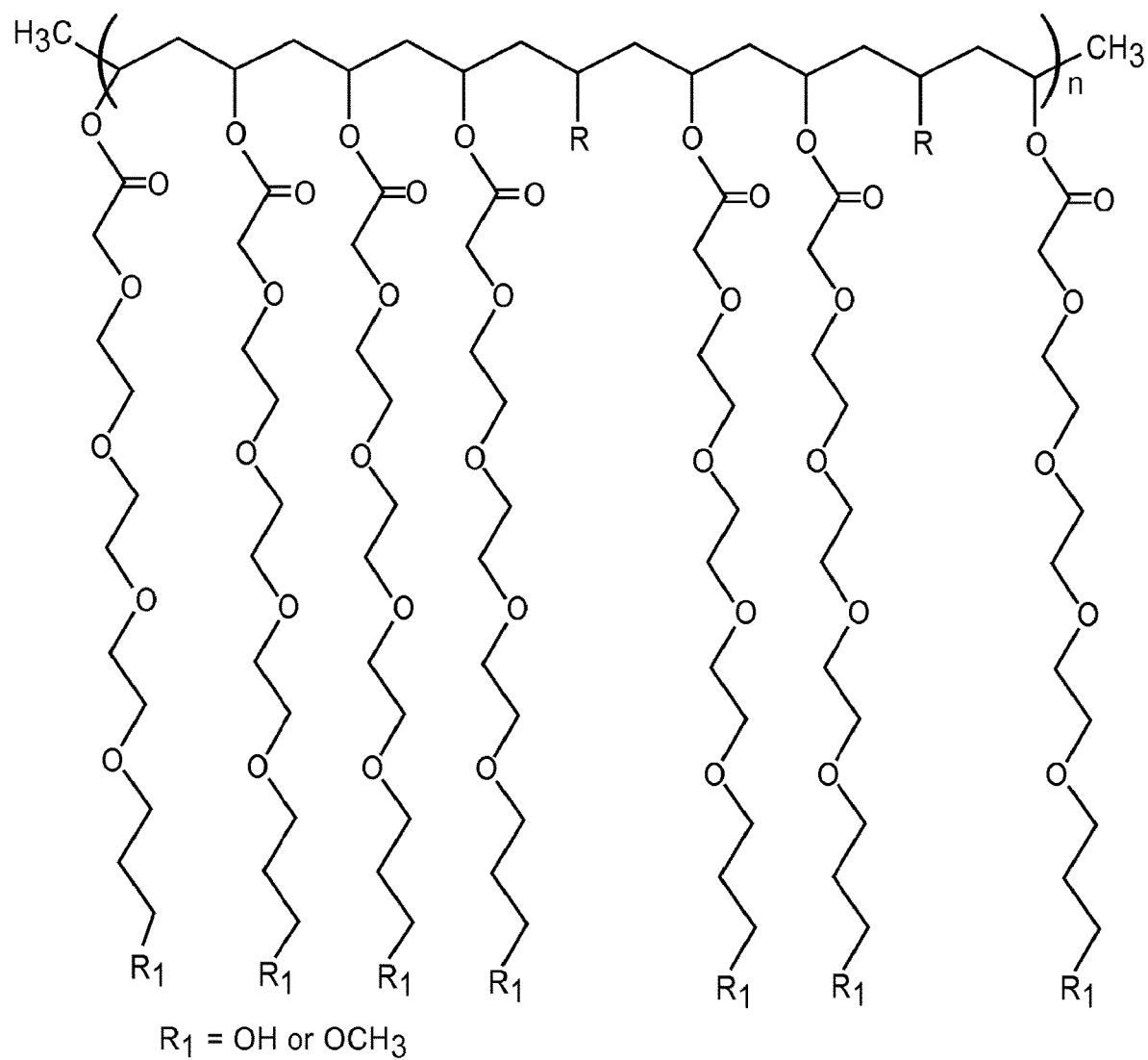
Figure 2B:
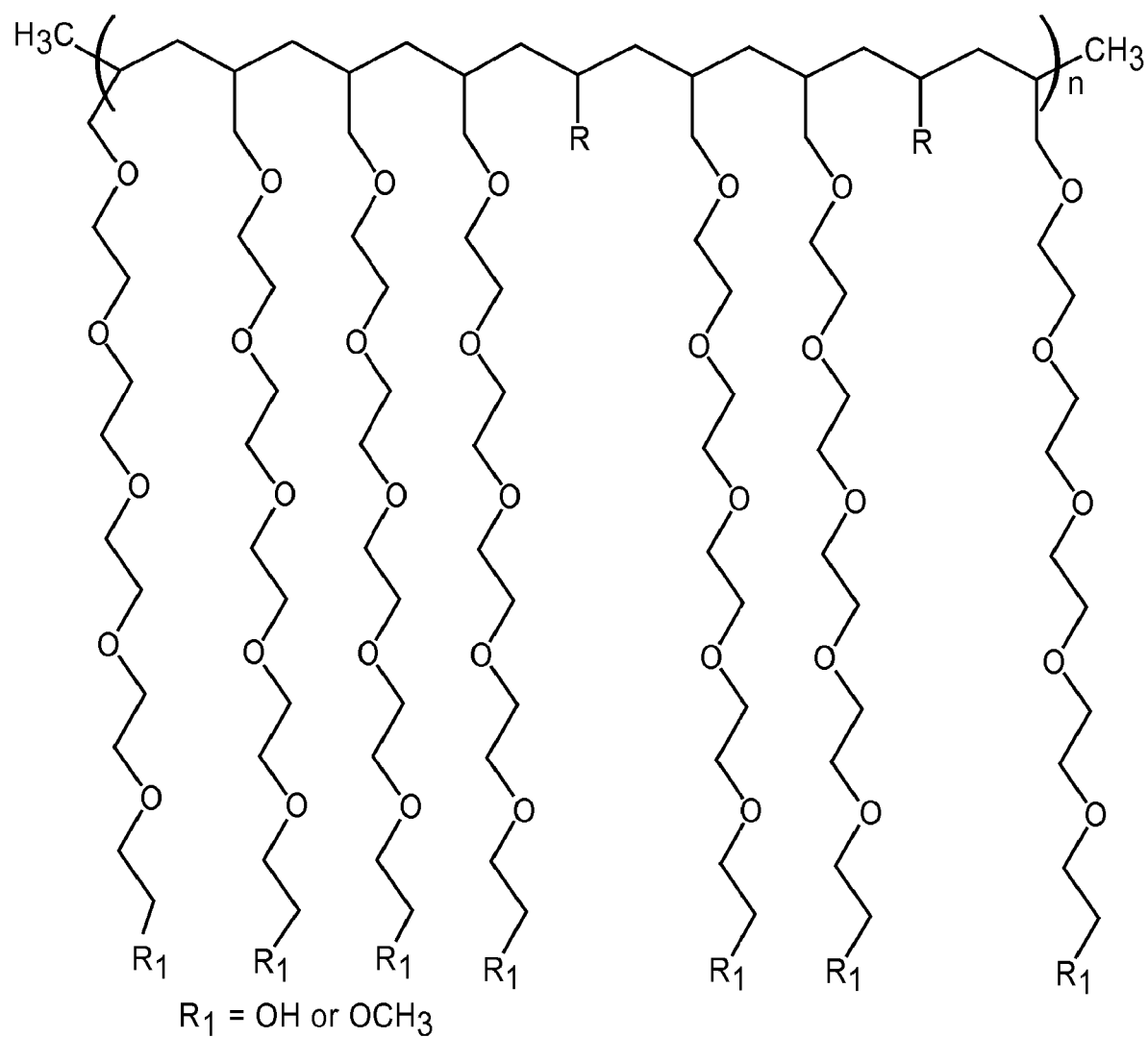

FIGS. 2a and 2b represent long chain glycol polyacrylates or polymethacrylates, where 2a is long chain glycol vinyl esters and 2b is long chain glycol vinyl ethers.

In FIGS. 1 and 2, R represents one or more of the reactive functions(s) described above. In those figures, the functions are drawn along the backbone, but that is only one option. As indicated above, the functions could also be placed at the end(s) of the backbone, on the side chains and any combination of those. Each FP-PCM may have a single or multiple reactive functions. FP-PCM may also carry multiple reactive functions of a similar chemical nature or a combination of reactive functions of different chemical nature.

Figure 5A:
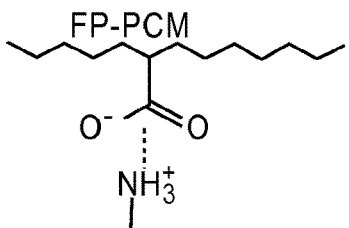
FIGS. 5A-5F are various embodiments of functional polymeric PCMs interacting with a substrate.
Figure 5B:
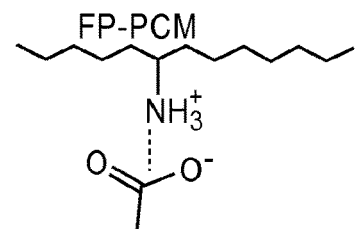
Figure 5C:
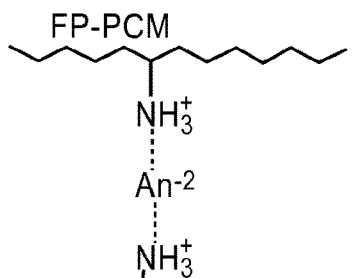
Figure 5D:
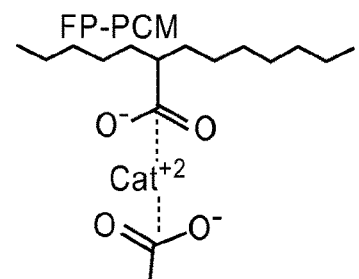
Figure 5E:
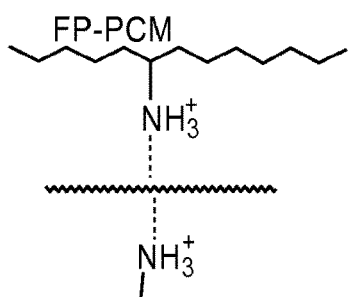
Figure 5F:
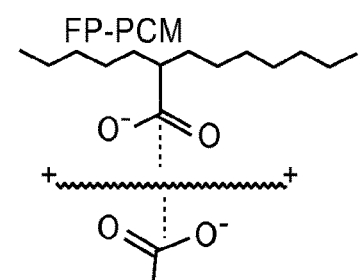

With reference to FIGS. 5A-5F, FIG. 5A drawing depicts an acidic or low pH carboxyl functional FP-PCM ionically interacting with a basic or high pH amino functional substrate. FIG. 5B depicts basic or high pH amino functional FP-PCM ionically interacting with an acidic or low pH carboxyl functional substrate. FIG. 5C depicts basic or high pH amino functional FP-PCM and a basic or high pH amino functional substrate being neutralized and ionically bound or "crosslinked" with an anion such as an amine. FIG. 5D depicts an acidic or low pH carboxyl functional FP-PCM and an acidic or low pH carboxyl functional substrate being neutralized and ionically bound or "crosslinked" with a cation such as a metal salt. FIG. 5E depicts basic or high pH amino functional FP-PCM and a basic or high pH amino functional substrate being neutralized and ionically bound or "crosslinked" with negatively charged organic compound such as dicarboxy functional polymer or dicarboxy functional FP-PCM. FIG. 5F depicts an acidic or low pH carboxyl functional FP-PCM and an acidic or low pH carboxyl functional substrate being neutralized and ionically bound or "crosslinked" with positively charged organic compound such as diamine functional polymer or diamine functional FP-PCM.

Figure 6A:
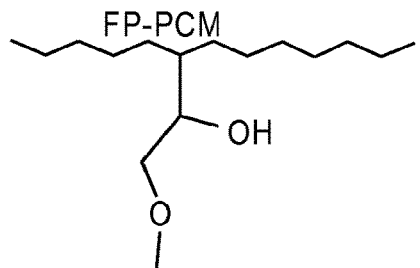
FIGS. 6A-6D are further embodiments of functional polymeric PCMs interacting with a substrate.
Figure 6B:
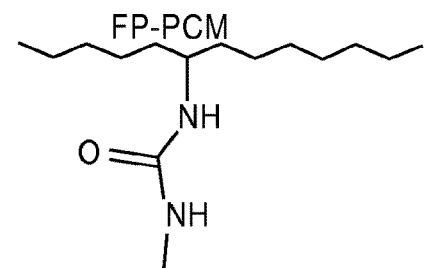
Figure 6C:
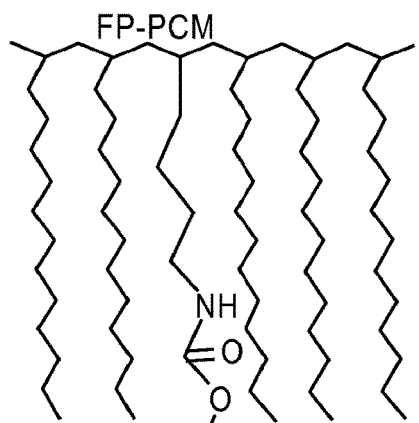
Figure 6D:
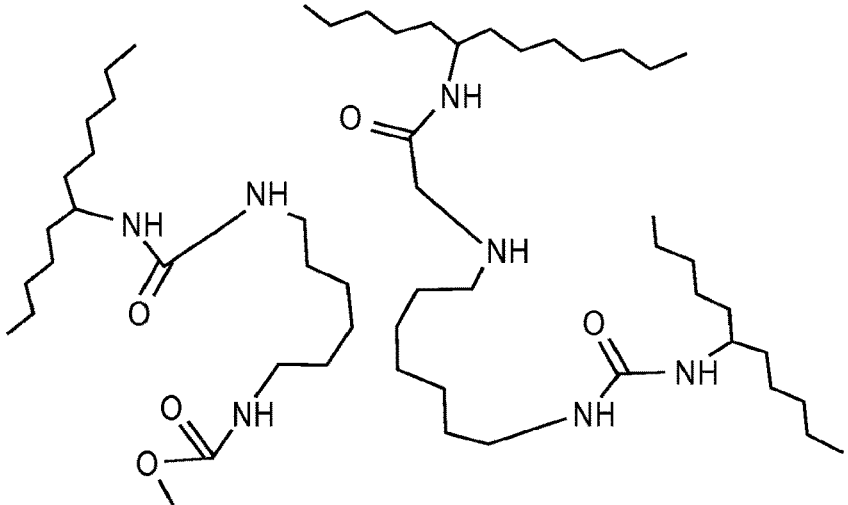

With reference to FIGS. 6A-6D, FIG. 6A depicts a covalent ether bond from the reaction of an FP-PCM epoxy and hydroxyl on a cellulose substrate. FIG. 6B depicts a covalent urea bond from the reaction of an FP-PCM isocyanate and amine from a proteinceous substrate such as wool or silk. FIG. 6C depicts a covalent urethane bond from the reaction of an FP-PCM isocyanate on the end of a side chain and hydroxyl from a cellulose substrate. FIG. 6D depicts a covalent urea and urethane bonds from the reaction of amine function, FP-PCMs, multifunctional isocyanate crosslinker/binder, and hydroxyl from a cellulose substrate.

EXAMPLES

The following examples are provided as representative of the various combinations and embodiments that may be created through the specific features described above and are not meant to be exclusive as to the scope of the claims. Furthermore, it is intended that the examples provided below not limit the completeness of the subject matter that is more appropriately captured by the full disclosure and description. It is intended that the present description serve as subject matter disclosure for any combination of the element previously disclosed.

Example 1—Preparation of Polyglycidyl Methacrylate

In a flask equipped with stirrer, condenser, nitrogen purge and temperature controller was reacted:

|  | Ingredients | wt. |
|---|---|---|
| 1.) | n-pentyl propionate (Dow Chemical, Midland MI) | 37.6 |
| 2.) | Glycidyl methacrylate (Dow Chemical, Midland MI) | 85.5 |
| 3.) | Di-t-amyl peroxide (Sigma-Aldrich Corp. Milwaukee WI) | 5.4 |
| 4.) | Di-t-amyl peroxide (Sigma-Aldrich Corp. Milwaukee WI) | 0.2 |

1 was added to the flask and heated to 152° C. under nitrogen. #2 and #3 were combined and added slowly to reaction flask over 5.5 hours. This was let react and additional 0.5 hours, then #4 added, let react for 1.0 hour then cooled to yield a 69.4% solution of polyglycidyl methacrylate. This solution was dried for 4 hrs @ 120° C. in a forced air oven to yield 100% dried polyglycidyl methacrylate.

Example 2—Preparation of Polymeric PCM

In a flask equipped with stirrer, condenser, nitrogen purge and temperature controller was reacted:

|  | Ingredients | wt. | functional eqiv. |
|---|---|---|---|
| 1.) | 95% Palmitic Acid | 36.15 | 0.141 |
| 2.) | Dried polyGMA from Ex. 1 above | 20.06 | 0.141 |

1 was added to the flask and heated to 130° C. under nitrogen. #2 was added slowly to reaction flask over 0.5 hours. This was let react and additional 3.0 hours, then cooled to yield a polymeric PCM with melt point of 38.5° C. and 63.1 J/g latent heat.

Example 3—Preparation of Polymeric PCM

In a flask equipped with stirrer, condenser, nitrogen purge and temperature controller was reacted:

|  | Ingredients | wt. | functional eqiv. |
|---|---|---|---|
| 1.) | 95% Myristic Acid | 34.67 | 0.152 |
| 2.) | Dried polyGMA from Ex. 1 above | 21.60 | 0.152 |

1 was added to the flask and heated to 130° C. under nitrogen. #2 was added slowly to reaction flask over 0.5 hours. This was let react and additional 3.0 hours, then cooled to yield a polymeric PCM with melt point of 16.1° C. and 29.8 J/g latent heat.

Example 4—Preparation of Polystearyl Methacrylate Polymeric PCM

In a flask equipped with stirrer, condenser, nitrogen purge and temperature controller was reacted:

|  | Ingredients | wt. |
|---|---|---|
| 1.) | n-pentyl propionate (Dow Chemical, Midland MI) | 36.1 |
| 2.) | SR324 Stearyl methacrylate (Sartomer Co., Exton PA) | 94.0 |
| 3.) | Glycidyl methacrylate (Dow Chemical, Midland MI) | 6.0 |
| 4.) | Di-t-amyl peroxide (Sigma-Aldrich Corp. Milwaukee WI) | 2.7 |
| 5.) | Di-t-amyl peroxide (Sigma-Aldrich Corp. Milwaukee WI) | 0.5 |

1 was added to the flask and heated to 152° C. under nitrogen. #2, #3 and #4 were combined and added slowly to reaction flask over 3.5 hours. This was let react and additional 1.0 hours, #5 added, let react for 1.5 hour then cooled to yield a 69.7% solution of polystearyl methacrylate-co-glycidyl methacrylate with a melt point of 31.1° C. and 83.8 J/g latent heat.

Example 5—Preparation of Wash Durable Temperature Regulating Textiles with Improved Latent Heat Content Desized, unbleached, undyed cotton fabric was treated by immersing into solutions of the polymeric PCMs with and without additional crosslinkers or fixatives. The immersed fabrics were then padded to remove excess solution dried for 4 minutes @ 190° C. The fabrics where rinsed with warm tap water to remove any unreacted polymer then air dried overnight and measured for latent heat content. The fabrics were then washed 5 times per AATCC 143.

| Ingredients | #1 | #2 | #3 |
|---|---|---|---|
|  | Weight (grams) | | |
| Polymeric PCM Ex. 2 | 5.13 | 5.25 |  |
| Cymel 385 (Cytec Industries, Inc., West Patterson, NJ) | 1.04 |  |  |
| Bayhydur VPLS 2306 (Bayer Polymers, Pittsburgh PA) |  | 1.18 |  |
| Acetone | 10.68 | 11.79 |  |
| Polymeric PCM Ex. 4 |  |  | 30.0 |

-continued

| Ingredients | #1 | #2 | #3 |
| --- | --- | --- | --- |
| | Weight (grams) | | |
| Wash Durability and Latent Heat Content (J/g) | | | |
| Treated Fabric | 8.1 | 14.5 | 37.3 |
| 5x Washes | 5.8 | 12.0 | 31.2 |

Example 6

Various polymeric PCMs were made similar to example 4 above, but the mol. wt. was varied by changing the amount of peroxide initiator or changing the polymerization solution solids.

Example 6 Polymeric PCM Molecular Weight Results

| Sample | DSC | J/g | Melt Peak | Mn | Mw | Mz | Pd |
| --- | --- | --- | --- | --- | --- | --- | --- |
| 4-123, mfg at 70% solids | Good | 83.8 | 31.1 | 2670 | 8040 | 14600 | 3.01 |
| 4-135, mfg at 75% solids | Acceptable | 73.5 | 33.5 | 4170 | 21400 | 50400 | 5.13 |
| 4-144, mfg at 100% solids | Poor | 63.6 | 26.2 | 4680 | 39200 | 232400 | 8.38 |

Example 7

Above polymeric PCM, 4-123, was dried to 100% solids then added to various polymer fiber solutions both in the lab and in production pilot plant. These solutions were either spun into fiber or cast into films, coagulated, and dried to yield polymeric PCM modified products. Solution A consisted of Acordis Itaconic acid func. CFP polyacrylonitrile polymer dissolved in 1:1 NaSCN:$H_2O$ to give a 10% final solution. Solution B consisted of Novaceta® diacetate dissolved in water:acetone mixture to give a 26.6% solids solution in a wt. ratio of cellulose diacetate/$H_2O$/Acetone, 26.6/3.9/69.5. Solution C was based on Novaceta pilot run using polymeric PCM produced at Ortec Inc.

Example 7 Fiber and Films

| Sample | % FP-PCM | Theory J/g | Measured J/g | Thermocycle and $C_6$ Extr. | % < Theory |
| --- | --- | --- | --- | --- | --- |
| Sol. A | 15.0 | 12.6 | 8.0 | | |
| Sol. B | 10.0 | 8.4 | 4.6 | 5.9 | 30 |
| Sol. C | 10.0 | 7.1 | 2.4 | 2.9 | 59 |

Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A temperature regulating article comprising:
   a substrate;
   a first functional polymeric phase change material bound to the substrate,
   wherein the first functional polymeric phase change material dynamically absorbs and releases heat to adjust heat transfer at or within a temperature stabilizing range and has at least one phase change temperature in the range between −10 degrees Celsius and 100 degrees Celsius and a phase change enthalpy of at least 2 Joules per gram, the first functional polymeric phase change material including a plurality of polymer chains that include a plurality of side chains and a phase change material;
   wherein the first functional polymeric phase change material carries at least one reactive function that cross-links one or more of the plurality of side chains to each of,
   a portion of the substrate, and
   a second functional polymeric phase change material capable of reacting with a reactive function of the substrate;
   wherein the first functional polymeric phase change material and the substrate are crosslinked by the reactive function.

2. An article according to claim 1, wherein the substrate is a molded substrate.

3. An article according to claim 1, wherein the first functional polymeric phase change material bound to the substrate is bound by at least one of covalent bonding or electrovalent bonding.

4. An article according to claim 1, wherein the first functional polymeric phase change material bound to the substrate is bound through direct bonding.

5. An article according to claim 1, wherein the first functional polymeric phase change material bound to the substrate is indirectly bound by a connecting compound.

6. An article according to claim 1, further comprising at least one ingredient selected from a group consisting of: an additional functional polymeric phase change material, an additional phase change material, encapsulated phase change materials, a binder, a formulation, an additive, cross-linkers, blending polymers, compatibilizers, wetting agents, and a combination of the foregoing.

7. An article according to claim 1, wherein the substrate is selected from the group consisting of: foams, plastic, polymeric layers, plastic films, plastic sheets, laminates and a combination of the foregoing.

8. An article according to claim 1, wherein the first functional polymeric phase change material comprises a reactive function selected from the group consisting of: an acid anhydride group, an alkenyl group, an alkynyl group, an alkyl group, an aldehyde group, an amide group, an amino group and their salts, a N-substituted amino group, an aziridine, an aryl group, a carbonyl group, a carboxy group and their salts, an epoxy group, an ester group, an ether group, a glycidyl group, a halo group, a hydride group, a hydroxy group, an isocyanate group, a thiol group, a disulfide group, a silyl or silane group, an urea group, and an urethane group.

9. An article according to claim 2, wherein the substrate comprises at least one of cellulose, wool, fur, leather, polyester and nylon.

10. An article according to claim 2, wherein the first functional polymeric phase change material comprises an anhydride function and the substrate comprises at least one of cellulose, polyester and nylon.

11. An article according to claim 2, wherein the first functional polymeric phase change material comprises an isocyanate function and the substrate comprises at least one of cellulose, polyester and nylon.

12. An article according to claim 2, wherein the first functional polymeric phase change material comprises a reactive function selected from a group consisting of an amine function and an amide function and the substrate comprises at least one of cellulose, polyester and nylon.

13. An article according to claim 2, wherein the first functional polymeric phase change material comprises a silane function and the substrate comprises at least one of cellulose, polyester and nylon.

14. An article according to claim 2, wherein the first functional polymeric phase change material comprises a double bond.

15. An article according to claim 1, wherein the first functional polymeric phase change material comprises at least one of a crystallizable hydrophilic section or a crystallizable hydrophobic section.

16. An article according to claim 1 wherein the substrate comprises at least one of starch and modified starch.

17. The article of claim 16 wherein the modified starch is selected from the group consisting of hydroxyethyl starch, hydroxypropyl starch, starch acetate, starch phosphate, starch, cationic starches, anionic starches and combinations of the foregoing.

18. The article of claim 1 wherein the substrate is a storage container.

19. The article of claim 1, wherein the substrate is a building component.

20. The article of claim 1, wherein the substrate comprises a medical device.

21. The article of claim 1, wherein the substrate comprises an electronic device.

22. The article of claim 1, further comprising:
a second phase change material contained within a containment structure, wherein the first functional phase change material forms a binder for at least a portion of the second phase change material.

23. The article of claim 22 wherein the containment structure is a microcapsule.

24. The article of claim 22, wherein the second phase change material is bonded to both the first functional polymeric phase change material and the substrate, wherein the bonding between the first functional polymeric phase change material and the substrate is a first reactive bond and the bonding between the containment structure and the substrate is a second reactive bond.

25. The article of claim 1 wherein the substrate is formed from plastic.

26. The article of claim 1, further comprising:
a third functional polymeric phase change material different from the first functional polymeric phase change material; and
wherein the third functional polymeric phase change material dynamically absorbs and releases heat to adjust heat transfer at or within a temperature stabilizing range and has at least one phase change temperature different from the phase change temperature of the first functional polymeric phase change material and a phase change enthalpy different from the phase change enthalpy of the first functional polymeric phase change material.

27. The article of claim 1, wherein the first functional polymeric phase change material carries at least one reactive function that also crosslinks one or more of the plurality of side chains to a similar side chain.

* * * * *